US012800741B2

(12) United States Patent
Mamandipoor et al.

(10) Patent No.: US 12,800,741 B2
(45) Date of Patent: Nov. 17, 2026

(54) ELECTRONIC DEVICES WITH LEAKAGE-BASED OBJECT DETECTION

(71) Applicant: Apple Inc., Cupertino, CA (US)

(72) Inventors: Babak Mamandipoor, San Jose, CA (US); Matthew A Mow, Los Altos, CA (US); Tideya Kella, San Jose, CA (US)

(73) Assignee: Apple Inc., Cupertino, CA (US)

( * ) Notice: Subject to any disclaimer, the term of this patent is extended or adjusted under 35 U.S.C. 154(b) by 184 days.

(21) Appl. No.: 18/616,575

(22) Filed: Mar. 26, 2024

(65) Prior Publication Data

US 2025/0102656 A1 Mar. 27, 2025

Related U.S. Application Data

(60) Provisional application No. 63/585,538, filed on Sep. 26, 2023.

(51) Int. Cl.
*G01S 13/04* (2006.01)
*G01S 7/40* (2006.01)
*G01S 7/41* (2006.01)

(52) U.S. Cl.
CPC ................ *G01S 13/04* (2013.01); *G01S 7/40* (2013.01); *G01S 7/41* (2013.01)

(58) Field of Classification Search
CPC ... G01S 13/04; G01S 7/40; G01S 7/41; G01S 7/4013; G01S 7/034; G01S 7/352; G01S 7/415; G01S 13/36; G01S 13/56
See application file for complete search history.

(56) References Cited

U.S. PATENT DOCUMENTS

| | | | | |
|---|---|---|---|---|
| 6,611,227 | B1 * | 8/2003 | Nebiyeloul-Kifle .... | G01S 7/412 342/195 |
| 11,782,151 | B2 * | 10/2023 | Hur ......................... | G01S 13/52 342/118 |
| 11,828,871 | B2 | 11/2023 | Schrattenecker et al. | |
| 2016/0213303 | A1 * | 7/2016 | Hyde ...................... | G01S 13/88 |
| 2020/0278438 | A1 * | 9/2020 | Huang ..................... | G01S 7/038 |
| 2020/0300970 | A1 * | 9/2020 | Nguyen .................. | G01S 13/88 |
| 2022/0291338 | A1 | 9/2022 | Hur et al. | |
| 2022/0381900 | A1 * | 12/2022 | Hur ......................... | G01S 13/52 |
| 2023/0003867 | A1 | 1/2023 | Yehezkel et al. | |

(Continued)

FOREIGN PATENT DOCUMENTS

CN 104777459 A * 7/2015 ............... G01S 7/36

*Primary Examiner* — Timothy A Brainard
*Assistant Examiner* — Bongani Jabulani Mashele
(74) *Attorney, Agent, or Firm* — Treyz Law Group, P.C.; Michael H. Lyons

(57) ABSTRACT

An electronic device may include sensing circuitry that transmits a radar signal over one or more antennas. The sensing circuitry may receive a reflected radar signal over the antenna(s). Transmission of the radar signal may produce a leakage signal that is combined with the reflected radar signal. A mixer may generate a beat signal based on the radar signal, the reflected radar signal, and the leakage signal. A sensing receiver may perform motion-based external object detection to detect the presence of an animate external object that is very close to the device. The sensing receiver may perform the motion-based detection based on time fluctuations in the power and/or phase of the signal without removing or cancelling the leakage signal.

20 Claims, 12 Drawing Sheets

(56) References Cited

U.S. PATENT DOCUMENTS

| | | | |
|---|---|---|---|
| 2023/0008446 A1 | 1/2023 | Kerner et al. | |
| 2023/0296751 A1 | 9/2023 | Forbes et al. | |
| 2023/0327929 A1 | 10/2023 | Schrattenecker et al. | |
| 2024/0094374 A1 | 3/2024 | Ney et al. | |

* cited by examiner

ELECTRONIC DEVICES WITH LEAKAGE-BASED OBJECT DETECTION

This application claims the benefit of U.S. Provisional Patent Application No. 63/585,538, filed Sep. 26, 2023, which is hereby incorporated by reference herein in its entirety.

FIELD

This disclosure relates generally to electronic devices and, more particularly, to electronic devices with wireless circuitry.

BACKGROUND

Electronic devices are often provided with wireless capabilities. An electronic device with wireless capabilities has wireless circuitry that includes one or more antennas. The wireless circuitry is sometimes used to perform spatial ranging operations in which radio-frequency signals are used to estimate a distance between the electronic device and an external object.

It can be challenging to accurately estimate the distance over a wide range of device operating conditions, such as when the external object is located relatively close to the wireless circuitry.

SUMMARY

An electronic device may include wireless circuitry controlled by one or more processors. The wireless circuitry may include communications circuitry for performing wireless communications. The wireless circuitry may include sensing circuitry for performing range detection on an external object. The sensing circuitry may transmit a radar signal over one or more antennas. The sensing circuitry may receive a corresponding reflected radar signal over the one or more antennas.

Transmission of the radar signal may produce a leakage signal that is combined with the reflected radar signal. In a frequency-modulated continuous-wave (FMCW) example, a mixer may generate a beat signal based on the radar signal, the reflected radar signal, and the leakage signal. A sensing receiver may perform motion-based external object detection to detect the presence of an external object in close proximity to the device. The sensing receiver may perform motion-based detection based on time fluctuations in beat signal without removing or cancelling out the leakage signal. For example, the sensing receiver may perform motion-based detection based on a portion of the beat signal where the signal contribution from the leakage signal is greater than the signal contribution from the reflected radar signal.

The sensing receiver may generate a target map based on the beat signal. The sensing receiver may generate phase and/or power time series signals based on the target map. The sensing receiver may generate a motion-based indicator associated with bulk motions of the external object over a short window in the time series signals. The sensing receiver may generate a correlation-based indicator associated with fluctuations over a long window in the time series signals and micro-motions of the external object. The indicator(s) may be compared to one or more thresholds to output a detection signal indicative of whether or not the external object is an animate object present within the threshold distance of the device. Inanimate objects having bulk and/or micro-motion may also be detected. Fusion may be performed across different spatial gates at a target indicator or target alert level. Biometric information may be extracted from the time series signals.

An aspect of the disclosure provides an electronic device. The electronic device can include one or more antennas. The electronic device can include a transmit path coupled to the one or more antennas and configured to transmit a radar signal using the one or more antennas. The electronic device can include a receive path coupled to the one or more antennas and configured to receive a reflected radar signal using the one or more antennas, wherein transmission of the radar signal on the transmit path produces a leakage signal on the receive path. The electronic device can include one or more processors configured to detect an external object based on a fluctuation in the leakage signal over time.

An aspect of the disclosure provides a method of operating an electronic device. The method can include transmitting, using a transmit path and one or more antennas, a radar signal. The method can include receiving, using the one or more antennas and a receive path, a reflected radar signal. The method can include generating, using a mixer on the receive path, a beat signal based on the radar signal, the reflected radar signal, and a leakage signal associated with leakage of the radar signal from the transmit path onto the receive path. The method can include detecting, using one or more processors, an external object based on a time fluctuation in at least a portion of the beat signal, the portion of the beat signal including more signal contribution from the leakage signal than from the reflected radar signal.

An aspect of the disclosure provides an electronic device. The electronic device can include one or more antennas. The electronic device can include a transmit path coupled to the one or more antennas and configured to transmit a radar signal using the one or more antennas. The electronic device can include a receive path coupled to the one or more antennas and configured to receive a reflected radar signal using the one or more antennas. The electronic device can include a mixer on the receive path and configured to generate a beat signal based on the radar signal and the reflected radar signal. The electronic device can include one or more processors configured to detect an animate object external to the electronic device based on a first fluctuation of the beat signal over a first time window and based on a second fluctuation of the beat signal over a second time window, wherein the second time window is longer than the first time window and includes the first time window.

DETAILED DESCRIPTION

Figure 1:
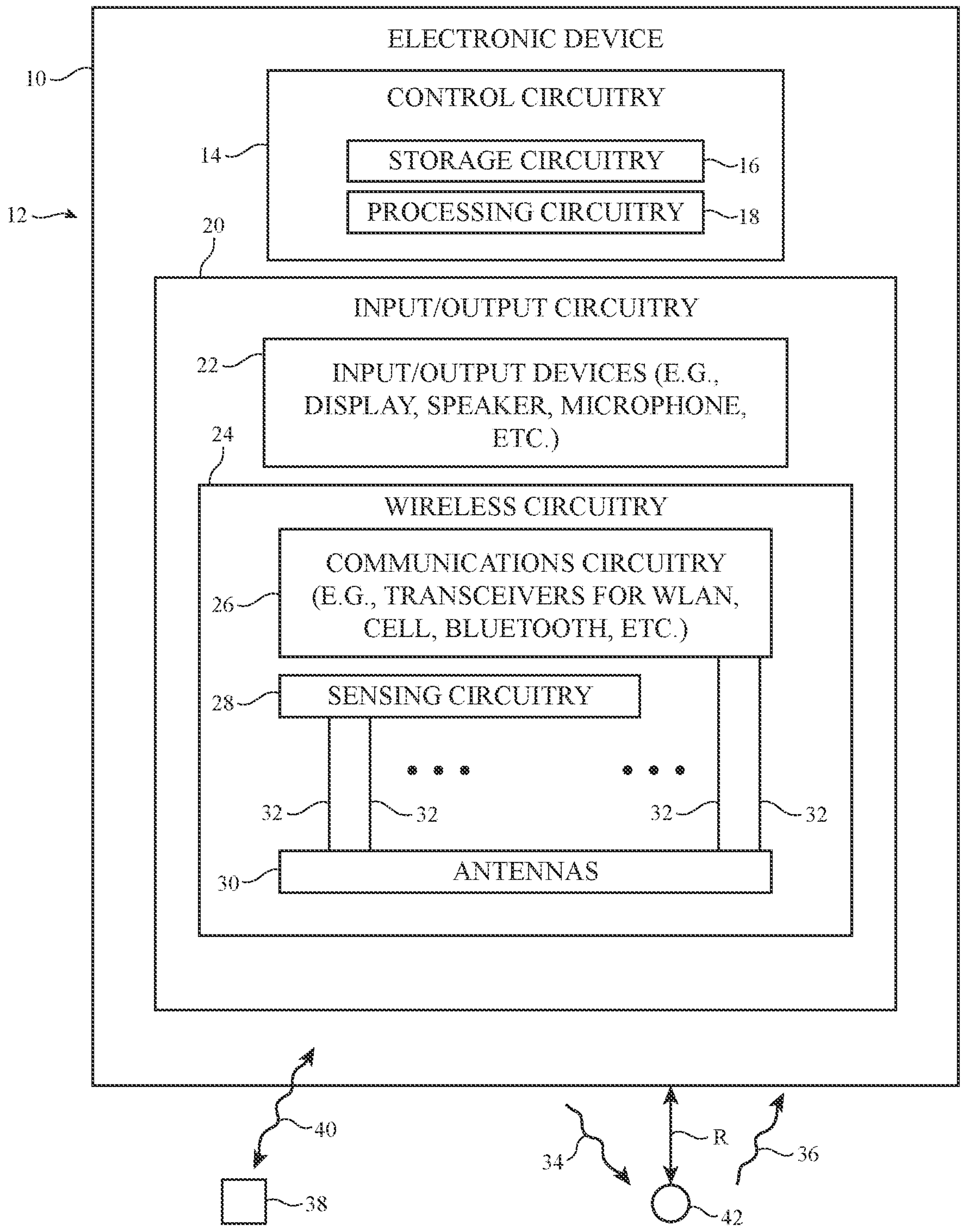
FIG. 1 is a schematic diagram of an illustrative electronic device having sensing circuitry for performing external object detection using antennas in accordance with some embodiments.

Electronic device 10 of FIG. 1 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head (e.g., virtual, mixed, and/or augmented reality goggles or glasses), or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the functional block diagram of FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, part or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more processors such as microprocessors, microcontrollers, digital signal processors, host processors, baseband processor integrated circuits, application specific integrated circuits, central processing units (CPUs), graphics processing units (GPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, 6G protocols, etc.), antenna diversity protocols, satellite navigation system protocols (e.g., global positioning system (GPS) protocols, global navigation satellite system (GLONASS) protocols, etc.), antenna-based spatial ranging (e.g., radio detection and ranging (radar)) protocols, or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22.

Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless circuitry 24 to support wireless communications and radio-based sensing operations. Wireless circuitry 24 (sometimes referred to herein as wireless communications circuitry 24) may include two or more antennas 30. Wireless circuitry 24 may also include baseband processor circuitry, transceiver circuitry, amplifier circuitry, filter circuitry, switching circuitry, analog-to-digital converter (ADC) circuitry, digital-to-analog converter (DAC) circuitry, radio-frequency transmission lines, and/or any other circuitry for transmitting and/or receiving radio-frequency signals using antennas 30.

Antennas 30 may be formed using any desired antenna structures for conveying radio-frequency signals. For example, antennas 30 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. Filter circuitry, switching circuitry, impedance matching circuitry, and/or other antenna tuning components may be adjusted to adjust the frequency response and wireless performance of antennas 30 over time. If desired, two or more of antennas 30 may be integrated into a phased antenna array (sometimes referred to herein as a phased array antenna) in which each of the antennas conveys radio-frequency signals with a respective phase and magnitude that is adjusted over time so the radio-frequency signals constructively and destructively interfere to produce a signal beam in a given beam pointing direction.

The term "convey radio-frequency signals" as used herein means the transmission and/or reception of the radio-frequency signals (e.g., for performing unidirectional and/or bidirectional wireless communications with external wireless communications equipment). Antennas 30 may transmit the radio-frequency signals by radiating the radio-frequency signals into free space (or to free space through intervening device structures such as a dielectric cover layer). Antennas 30 may additionally or alternatively receive the radio-frequency signals from free space (e.g., through intervening devices structures such as a dielectric cover layer). The transmission and reception of radio-frequency signals by antennas 30 each involve the excitation or resonance of antenna currents on an antenna resonating element in the antenna by the radio-frequency signals within the frequency band(s) of operation of the antenna.

Wireless circuitry 24 may include communications circuitry 26 (sometimes referred to herein as wireless communications circuitry 26) for transmitting and/or receiving wireless communications data using antennas 30 (e.g., using wireless signals 40 conveyed with external equipment 38 such as a wireless access point or base station). Communications circuitry 26 may include baseband circuitry (e.g., one or more baseband processors) and one or more radios (e.g., radio-frequency transceivers, modems, etc.) for conveying radio-frequency signals using one or more antennas 30. Communications circuitry 26 may use antennas 30 to transmit and/or receive radio-frequency signals that convey the wireless communications data between device 10 and external wireless communications equipment (e.g., one or more other devices such as device 10, a wireless access point or base station, etc.). The wireless communications data may be conveyed bidirectionally or unidirectionally. The wireless communications data may, for example, include data that has been encoded into corresponding data packets such as wireless data associated with a telephone call, streaming media content, internet browsing, wireless data associated with software applications running on device 10, email messages, etc.

Wireless circuitry 24 may transmit and/or receive radio-frequency signals within corresponding frequency bands at radio frequencies (sometimes referred to herein as communications bands or simply as "bands"). The frequency bands handled by wireless circuitry 24 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, cellular sidebands, 6G bands between 100-1000 GHz (e.g., sub-THz, THz, or THF bands), etc.), other centimeter or millimeter wave frequency bands between 10-300 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, industrial, scientific, and medical (ISM) bands such as an ISM band between around 900 MHz and 950 MHz or other ISM bands below or above 1 GHz, one or more unlicensed bands, one or more bands reserved for emergency and/or public services, and/or any other desired frequency bands of interest.

In addition to conveying wireless communications data, wireless circuitry 24 may also use antennas 30 to perform radio-frequency sensing operations (sometimes referred to herein as radio-based sensing operations, spatial ranging operations, radio detection and ranging (radar) operations, or simply as sensing operations). The sensing operations may allow device 10 to detect (e.g., sense or identify) the presence, location, orientation, and/or velocity (motion) of objects external to device 10 such as external object 42. Detecting, sensing, or identifying the presence, location, orientation, and/or velocity (motion) of external object 42 at any given time or over a given time period may sometimes be referred to herein simply as detecting the external object or performing spatial ranging operations, ranging operations, radio-based sensing operations, or range detection. The sensing operations may be performed over a relatively short range such as ranges of a few mm or cm from antennas 30 or over longer ranges such as ranges of dozens of cm, a few meters, dozens of meters, etc.

External object 42 may be, for example, the ground, a building, part of a building, a wall, furniture, a ceiling, a person, a body part (e.g., the head, hand, finger, or other body part of the user of device 10 or other humans in the vicinity of device 10), an animal, a vehicle, a landscape or geographic feature, an obstacle, external communications equipment, another device of the same type as device 10 or a peripheral/accessory device such as a gaming controller, stylus (e.g., for providing input to a touch and/or force-sensitive display on device 10), or remote control, or any other physical object or entity that is external to device 10. External object 42 may be animate (e.g., moving or living) or inanimate (e.g., stationary or non-living).

External object 42 is sometimes also referred to herein as target object 42 or target 42. The radio-frequency sensing performed by sensing circuitry 28 may include target (object) detection on target 42. As used herein, target detection, object detection, or detecting target 42 involves the detection, monitoring, measurement, and/or sensing, by sensing circuitry 28, of a selected characteristic of target 42 using radio-frequency signals conveyed over one or more antennas 30. The characteristic may be the presence or absence of target (e.g., at or adjacent to device 10, at a particular position relative to device 10, within a threshold range of device 10, at an expected position, etc.), the location, position, velocity, speed, movement, rotation, and/or orientation of target 42 (e.g., over time), the distance between device 10 and target 42 (sometimes referred to herein as range R), that target 42 is an expected or particular type of object as opposed to another type of object (e.g., to verify or authenticate that target 42 is a particular object instead of a different object, that target 42 is formed from a particular material and not another material, etc.), a particular motion or movement of target 42 (e.g., a gesture or action performed by target 42 that matches a predetermined gesture or action), that target 42 is an animate object as opposed to an inanimate object, that target 42 is an inanimate object as opposed to an animate object, that target 42 is an animate object within a threshold range $R_{TH}$ of wireless circuitry 24 and/or device 10, or any other information associated with target 42. It should be appreciated that device 10 may perform target detection even when target 42 is absent at or near device 10 (e.g., target detection operations may be performed to detect whether target 42 is present at or near device 10, animate, and/or within a threshold range $R_{TH}$ of device 10, etc.).

Control circuitry 14 may use the detection of target 42 (e.g., detection of the selected characteristic of target 42 such as detection of the presence of target 42 as an animate object within threshold range $R_{TH}$) to perform any desired device operations. As examples, control circuitry 14 may use the detection of target 42 to identify a corresponding user input for one or more software applications running on device 10 such as a gesture input performed by the user's hand(s) or other body parts or performed by an external stylus, gaming controller, head-mounted device, or other peripheral devices or accessories, to determine when one or more antennas 30 needs to be disabled or provided with a reduced maximum transmit power level (e.g., for satisfying regulatory limits on radio-frequency exposure when target 42 is a body part located within a threshold range of device 10), to determine how to steer a radio-frequency signal beam produced by antennas 30 for communications circuitry 26 (e.g., in scenarios where antennas 30 include a phased array of antennas 30), to map or model the environment around device 10 (e.g., to produce a software model of the room where device 10 is located for use by an augmented reality application, gaming application, map application, home design application, engineering application, etc.), to detect the presence of obstacles in the vicinity of (e.g., around) device 10 or in the direction of motion of the user of device 10, etc.

Wireless circuitry 24 may include sensing circuitry 28 for performing radio-based sensing operations using antennas 30. Sensing circuitry 28 may include a sensing transmitter (e.g., transmitter circuitry including signal generators, synthesizers, etc.), a sensing receiver, mixer circuitry, amplifier circuitry, filter circuitry, baseband circuitry, ADC circuitry, DAC circuitry, and/or any other desired components used in performing sensing operations using antennas 30. Sensing circuitry 28 may perform the sensing operations using radio-frequency sensing signals such as sensing signals 34 that are transmitted by antennas 30 (sometimes referred to herein as radar signals 34) and using reflected (back-scattered) versions of the transmitted sensing signals that have reflected off an external object around device 10 such as target 42 (sometimes referred to herein as reflected sensing signals 36, reflected signals 36, or reflected radar signals 36).

Sensing circuitry 28 may, for example, transmit and receive radar signals using a frequency-modulated continuous-wave (FMCW) radar scheme, a full-duplex ranging scheme, an orthogonal frequency division multiplexing (OFDM) radar scheme, a phase-modulated continuous-wave (PMCW) radar scheme, a stepped frequency continuous wave (SFCW) radar scheme, a pulse radar scheme, or other ranging schemes. Antennas 30 may include separate antennas for conveying wireless communications data for communications circuitry 26 and for conveying radar signals or may include one or more antennas 30 that are used to both convey wireless communications data and to perform sensing operations. Using a single antenna 30 to both convey wireless communications data and perform sensing operations may, for example, serve to minimize the amount of space occupied in device 10 by antennas 30.

Sensing circuitry 28 may be coupled to antennas 30 over at least two radio-frequency transmission line paths 32. Communications circuitry 26 may be coupled to antennas 30 over at least one radio-frequency transmission line path 32. Separate radio-frequency transmission line paths 32 may couple sensing circuitry 28 and communications circuitry 26 to antennas 30 (e.g., as shown in FIG. 1) or one or more radio-frequency transmission line paths 32 may couple one or more antennas 30 to both sensing circuitry 28 and communications circuitry 26. If desired, sensing circuitry 28 may be integrated into communications circuitry 26 (e.g., communications circuitry 26 may also perform spatial ranging operations).

Radio-frequency transmission line paths 32 may include coaxial cables, microstrip transmission lines, stripline transmission lines, edge-coupled microstrip transmission lines, edge-coupled stripline transmission lines, transmission lines formed from combinations of transmission lines of these types, etc. Radio-frequency transmission line paths 32 may be integrated into rigid and/or flexible printed circuit boards if desired. Radio-frequency front end (RFFE) modules may be interposed on one or more radio-frequency transmission line paths 32. The radio-frequency front end modules may include substrates, integrated circuits, chips, or packages that are separate from sensing circuitry 28 and communications circuitry 26 and may include filter circuitry, switching circuitry, amplifier circuitry, impedance matching circuitry, radio-frequency coupler circuitry, and/or any other desired radio-frequency circuitry for operating on the radio-frequency signals conveyed over radio-frequency transmission line paths 32.

The example of FIG. 1 is illustrative and non-limiting. While control circuitry 14 is shown separately from wireless circuitry 24 in the example of FIG. 1 for the sake of clarity, wireless circuitry 24 may include processing circuitry (e.g., one or more processors) that forms a part of processing circuitry 18 and/or storage circuitry that forms a part of storage circuitry 16 of control circuitry 14 (e.g., portions of control circuitry 14 may be implemented on wireless circuitry 24). As an example, control circuitry 14 may include baseband circuitry (e.g., one or more baseband processors), digital control circuitry, analog control circuitry, and/or other control circuitry that forms part of communications circuitry 26 and/or sensing circuitry 28. The baseband circuitry may, for example, access a communication protocol stack on control circuitry 14 (e.g., storage circuitry 20) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer. If desired, the PHY layer operations may additionally or alternatively be performed by radio-frequency (RF) interface circuitry in wireless circuitry 24.

In some implementations that are described herein as an example, sensing circuitry 28 may be used to detect target 42 for use in ensuring that antennas 30 comply with regulatory requirements on the exposure/absorption of radio-frequency energy by human tissue (e.g., maximum permissible exposure (MPE) limits, specific absorption rate (SAR) limits, or other regulatory limits). In general, maximizing transmitted power for communications circuitry 26 allows device 10 to achieve optimal performance in conveying wireless data with external equipment 38. However, if care is not taken, such high transmit power levels can cause device 10 to violate regulatory limits on exposure/absorption when target 42 is a human body part and when target 42 is at a location subject to significant exposure/absorption of radio-frequency energy. Sensing target 42 using sensing circuitry 28 may offer several advantages over other types of sensors such as image sensors. For example, sensing circuitry 28 may exhibit more privacy, a smaller sensing form factor, and a wider field of view than image sensors. In addition, sensing circuitry 28 may function in any lighting conditions, unlike image sensors.

Without knowledge of the presence of human body parts near transmitting antennas 30, a reduced maximum transmit power limit needs to be set for the antennas to satisfy the regulatory requirements (e.g., a maximum transmit power level lower than the maximum transmit power level supported by power amplifiers in communications circuitry 26), sacrificing communications performance of those antennas 30. Achieving awareness of the presence of human body parts near or relative to active antennas 30 using radar sensing (e.g., sensing circuitry 28) may serve to maximize the communications performance of the antennas. For example, the sensing circuitry may allow communications circuitry 26 to maximize its emitted power level (e.g., without any maximum transmit power level backoff) when no human is at risk of exposure exceeding the regulatory limits (e.g., when target 42 is not human or not at a location subject to substantial radio-frequency exposure), while backing off maximum transmit power level only when human presence is detected at a location that risks exposure exceeding the regulatory limits.

Figure 2:
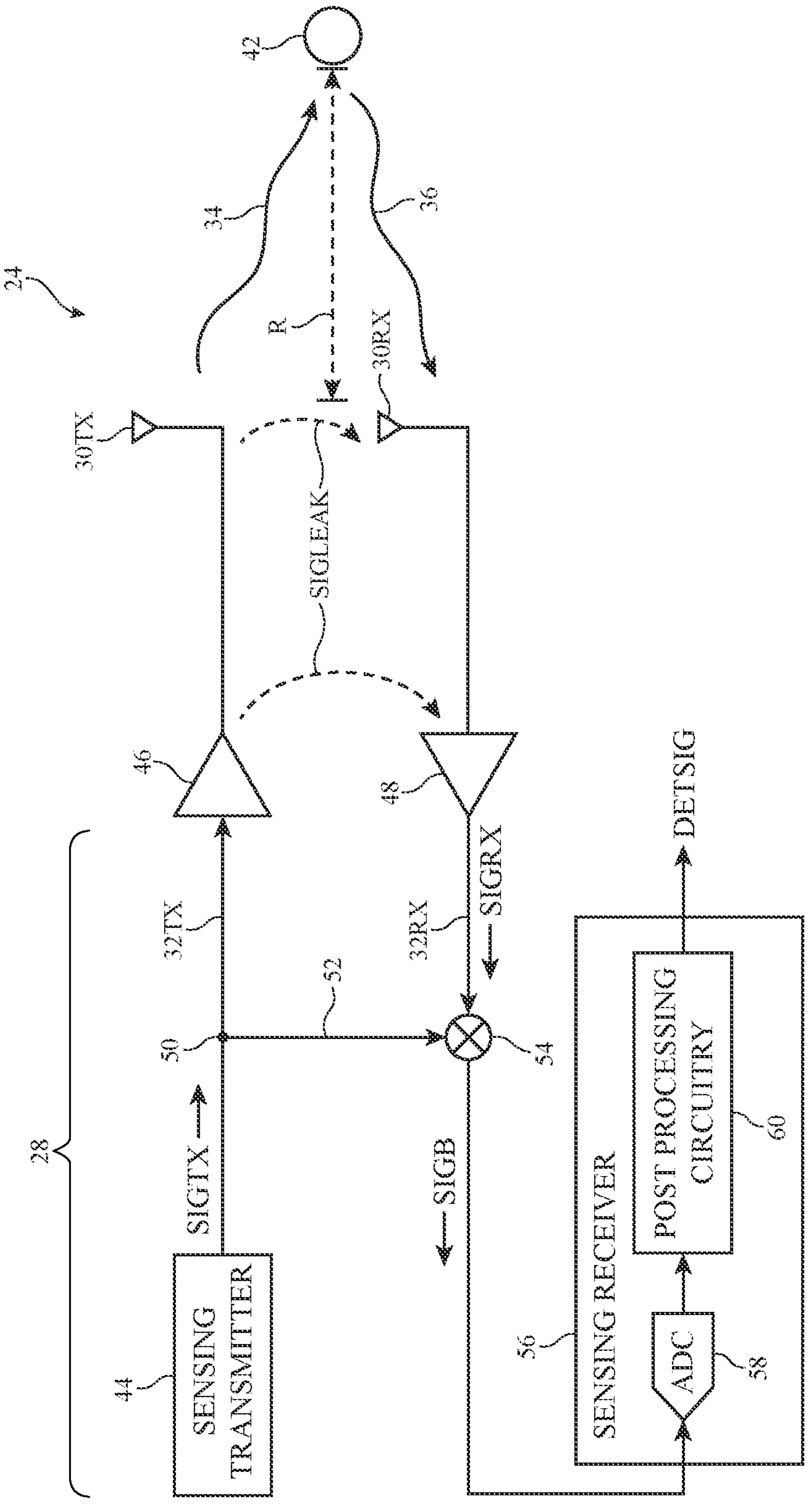
FIG. 2 is a circuit diagram of illustrative sensing circuitry having a sensing receiver that performs external object detection based on a leakage signal in accordance with some embodiments.

FIG. 2 is a circuit diagram of sensing circuitry 28. As shown in FIG. 2, sensing circuitry 28 may include at least one sensing transmitter 44 and at least one sensing receiver 56. The output of sensing transmitter 44 may be communicably coupled to a first antenna 30 such as antenna 30TX (sometimes referred to herein as transmit antenna 30TX) over radio-frequency transmission line path 32TX (sometimes referred to herein as transmit path 32TX or transmit chain 32TX). The input of sensing receiver 56 may be communicably coupled to a second antenna 30 such as antenna 30RX (sometimes referred to herein as receive antenna 30RX) over radio-frequency transmission line path 32RX (sometimes referred to herein as receive path 32RX or receive chain 32RX). One or more amplifiers such as power amplifier 46 may be disposed on transmit path 32TX between sensing transmitter 44 and transmit antenna 30TX. One or more amplifiers such as low noise amplifier 48 may be disposed on receive path 32RX between receive antenna 30RX and sensing receiver 56.

If desired, transmit antenna 30TX may also be used to transmit and/or receive radio-frequency signals that convey wireless communications data for communications circuitry 26 (FIG. 1). Similarly, if desired, receive antenna 30RX may also be used to transmit and/or receive radio-frequency signals that convey wireless communications data for communications circuitry 26. The transmit antenna and the receive antenna may be the same antenna or portions of the same antenna if desired (e.g., sensing transmitter 44 and sensing receiver 56 may be coupled to a single antenna over transmit path 32TX and receive path 32RX respectively). In general, sensing circuitry 28 may use a set of one or more antennas 30 to perform radio-frequency sensing.

Sensing transmitter 44 may transmit radio-frequency sensing signals SIGTX over transmit path 32TX and antenna 30TX. Power amplifier 46 amplifies the sensing signals SIGTX on transmit path 32TX. Sensing signals SIGTX may include any desired signals or waveforms for performing spatial ranging operations (e.g., chirp signals, one or more tones, continuous waves of radio-frequency energy, other radar waveforms, etc.). Sensing signals SIGTX may be transmitted using any desired carrier frequencies (e.g., frequencies greater than 10 GHz, greater than 20 GHz, less than 60 GHz, less than 10 GHz, less than 6 GHz, less than 1 GHz, greater than 100 GHz, etc.).

An implementation in which sensing signals SIGTX include chirp signals is described herein as an example. Chirp signals include frequency ramps (sometimes referred to as chirps) that periodically ramp up or down over time. In this example, sensing transmitter 44 may include a signal generator or synthesizer (e.g., a digital chirp generator) that generates the chirp signals and provides the chirp signals to a digital-to-analog converter (DAC) in sensing transmitter 44. The DAC converts the chirp signals to the analog domain and provides the analog chirp signals to a mixer in sensing transmitter 44. The mixer up-converts the analog chirp signals to radio frequencies (as sensing signals SIGTX) using a clocking signal such as a local oscillator signal produced by a local oscillator (LO) in sensing transmitter 44. Antenna 30TX radiates sensing signals SIGTX as radar signals 34 (e.g., wireless radio-frequency signals having a radar waveform). Unlike the radio-frequency signals transmitted by communications circuitry 26 of FIG. 1, sensing signals SIGTX and radar signals 34 may be free from wireless communications data (e.g., cellular communications data packets, WLAN communications data packets, etc.).

Radar signals 34 may reflect off objects external to device 10 (e.g., target 42) as reflected signals 36. As shown in FIG. 2, sensing circuitry 28 may include a mixer such as mixer 54 disposed on receive path 32RX between low noise amplifier 48 and sensing receiver 56. Mixer 54 may have a first input coupled to node 50 on transmit path 32TX over de-chirp path 52. Node 50 may be disposed on transmit path 32TX between sensing transmitter 44 and power amplifier 46, for example. Mixer 54 may have a second input coupled to the output of low noise amplifier 48. The output of mixer 54 may be coupled to the input of sensing receiver 56. Mixer 54 is sometimes also referred to herein as de-chirp mixer 54.

Receive antenna 30RX may receive reflected signals 36 (e.g., a reflected version of radar signals 34 that has reflected off target 42 or and/other external objects) and may pass the reflected signals to mixer 54 via receive path 32RX and low noise amplifier 48 (e.g., as received sensing signals SIGRX). Received sensing signals SIGRX may include the sensing SIGTX (e.g., chirp signals) that have reflected off target 42 and that have been received by receive antenna 30RX. Node 50 on transmit path 32TX may include a radio-frequency signal coupler or signal splitter that couples some of the sensing signals SIGTX propagating along transmit path 32TX onto de-chirp path 52. If desired, one or more amplifiers (not shown) may be disposed on de-chirp path 52 to boost the amplitude of the sensing signals SIGTX provided to de-chirp mixer 54.

De-chirp mixer 54 may receive sensing signals SIGRX at its second input (e.g., from low noise amplifier 48). De-chirp mixer 54 may mix the sensing signals SIGTX received at its first input (over de-chirp path 52) with the received sensing signals SIGRX received at its second input (over receive path 32RX) to produce or generate signals SIGB at baseband or an intermediate frequency. Signals SIGB may correspond to beats associated with the difference in phase between the transmitted sensing signals SIGTX and the received sensing signals SIGRX. Signals SIGB may therefore sometimes be referred to herein as beat signals SIGB. If desired, additional mixers (not shown) may be disposed on receive path 32RX between de-chirp mixer 54 and sensing receiver 56 for further downconverting beat signals SIGB to baseband in implementations where de-chirp mixer 54 outputs the beat signals at an intermediate frequency.

Sensing receiver 56 may receive beat signals SIGB from de-chirp mixer 54. Sensing receiver 56 may include an analog-to-digital converter (ADC) that converts beat signals SIGB from the analog domain to the digital domain. Sensing receiver 56 may include post processing circuitry 60 that receives digital beat signals SIGB from ADC 58. Post processing circuitry 60 may process the digital beat signals SIGB to perform object detection on target 42. For example, post processing circuitry 60 may measure range R, Doppler information, angle (e.g., azimuth and/or elevation), power level, and/or phase of targets in the field of view of antenna(s) 30 based on beat signals SIGB.

Post processing circuitry 60 may output a detection signal DETSIG based on beat signals SIGB. Detection signal DETSIG may include information associated with the object detection (e.g., may identify the detected range R or other detected characteristics of target 42). In some implementations that are described herein as an example, post processing circuitry 60 may detect whether or not target 42 is an animate object within a threshold range $R_{TH}$ of wireless circuitry 24. In this example, detection signal DETSIG may include a binary logic value, flag, or alert identifying either that an animate object (target 42) is present within threshold range $R_{TH}$ of wireless circuitry 24 or that no animate object (target 42) is present within threshold range $R_{TH}$ of wireless circuitry 24. Control circuitry 14 (FIG. 1) may perform any desired operations based on detection signal DETSIG. The example of FIG. 2 is illustrative and non-limiting. If desired, de-chirp mixer 54 may be implemented as a part of sensing receiver 56. Other sensing (spatial ranging) circuit architectures may be used if desired.

If desired, two or more of the antennas 30 used by sensing circuitry 28 may be integrated into a radar module (e.g., in an array such as a phased antenna array). Each antenna may transmit, receive, or transmit and receive sensing signals. Each of the antennas in the module may be synchronized in time, frequency, and phase (e.g., using the same LO distribution). The spacing between the antennas in the module may be uniform or non-uniform (e.g., in a MIMO radar arrangement). The module may have beamforming, mono-static, multi-static, and/or MIMO capabilities. The antennas may be arranged in a one-dimensional, two-dimensional, or three-dimensional pattern in the array. The antennas may share a local oscillator, waveform synthesizer (e.g., sensing transmitter 44), control and timing units, memory, and/or processing circuitry (e.g., sensing receiver 56).

In implementations where sensing signal SIGTX is a chirp waveform (e.g., under an FCMW architecture), the chirp waveform may periodically sweep (e.g., linearly ramp) up or down in frequency across the bandwidth of the chirp as a function of time. In these implementations, the reflected (back-scattered) signals are a delayed and attenuated version of the transmitted signal that are then mixed with the transmitted signal at de-chirp mixer 54.

As an example, when target 42 is at a range of $R(\tau)=R_0+\Delta R(\tau)$, where $\tau$ is the roundtrip time delay of the transmitted and reflected signal (e.g., where $R=c*\tau/2$ and c is the speed of light), beat signal SIGB may be given by the equation $x(t,\tau)\cong\exp(-j*(4*\pi/\lambda))*R(\tau))*\exp(-j*2*\pi*f_b(\tau)*t)$, where the first exponential term specifies the phase, the second exponential term specifies the frequency, $\lambda$ is the carrier wavelength, and $f_B$ is the beat frequency having a resolution determined by the chirp bandwidth (e.g., where $f_B\cong k*(2*R_0/c)$ and k is the slope of the transmitted chirp signal).

In this example, the accuracy for the estimation of target range R through estimation of beat signal SIGB at frequency $f_B$ is determined by the Rayleigh resolution limit $R_{res}$, which is inversely proportional to the bandwidth B of the chirp signal (e.g., $R_{res}=c/(2*B)$). For example, a bandwidth of B=1 GHz may provide a range resolution of approximately 15 cm. This may be suitable for detecting the overall location of the target and/or to separate the objects/reflectors located at different ranges. At the same time, the accuracy for the estimation of the phase of beat signal SIGB is proportional to the wavelength of the RF carrier (e.g., where phase $\Delta\phi=(4*\pi/\lambda)*\Delta R$), which makes phase detection suitable for fine-grain estimation of variations in the range of the target. For example, when the carrier frequency is 60 GHz (corresponding to a wavelength of approximately 5 mm), the detectable target range variation $\Delta R$=1.25 mm leads to a 180 degree phase rotation of beat signal SIGB.

Sensing circuitry 28 may transmit and receive sensing signals using a radar frame structure such as a radar data cube, as one example. The radar data cube is a three-dimensional construct having fast time (ADC samples) on a first axis, different antennas on a second axis orthogonal to the first axis, and slow time (pulses/chirps) on a third axis orthogonal to the first and second axes. Sensing circuitry 28 may capture multiple frames (data cubes) over time. Each frame may have a corresponding frame duration. The time interval between the frames is referred to as the frame repetition interval (FRI).

In practice, there is limited electromagnetic isolation between transmit path 32TX and receive path 32RX. However, sensing circuitry 28 concurrently transmits sensing signals SIGTX and receives reflected signals 36 in the same frequency band. This causes at least of the transmitted sensing signals SIGTX to leak onto receive path 32RX prior to reflection off target 42, as leakage signal SIGLEAK. Leakage signal SIGLEAK is sometimes also referred to as a self-interference signal.

Leakage signal SIGLEAK may leak from transmit path 32TX (e.g., before and/or after power amplifier 46) onto receive path 32RX (e.g., before and/or after low noise amplifier 48) and/or from transmit antenna 30TX onto receive antenna 30RX (e.g., directly over-the-air without reflection off target 42). Leakage signal SIGLEAK can include multiple spectral components or a continuum of spectral components. In some situations, leakage signal SIGLEAK can generate sidelobes that extend beyond the true spectral components in the leakage. Leakage signal SIGLEAK is included in the received sensing signal SIGRX passed to de-chirp mixer 54 along receive path 32RX (e.g., received sensing signal SIGRX includes a combination of the received reflected signals 36 and leakage signal SIGLEAK). Beat signal SIGB will therefore include contributions from both leakage signal SIGLEAK and the reflected signals 36 back-scattered off target 42.

Figure 3:
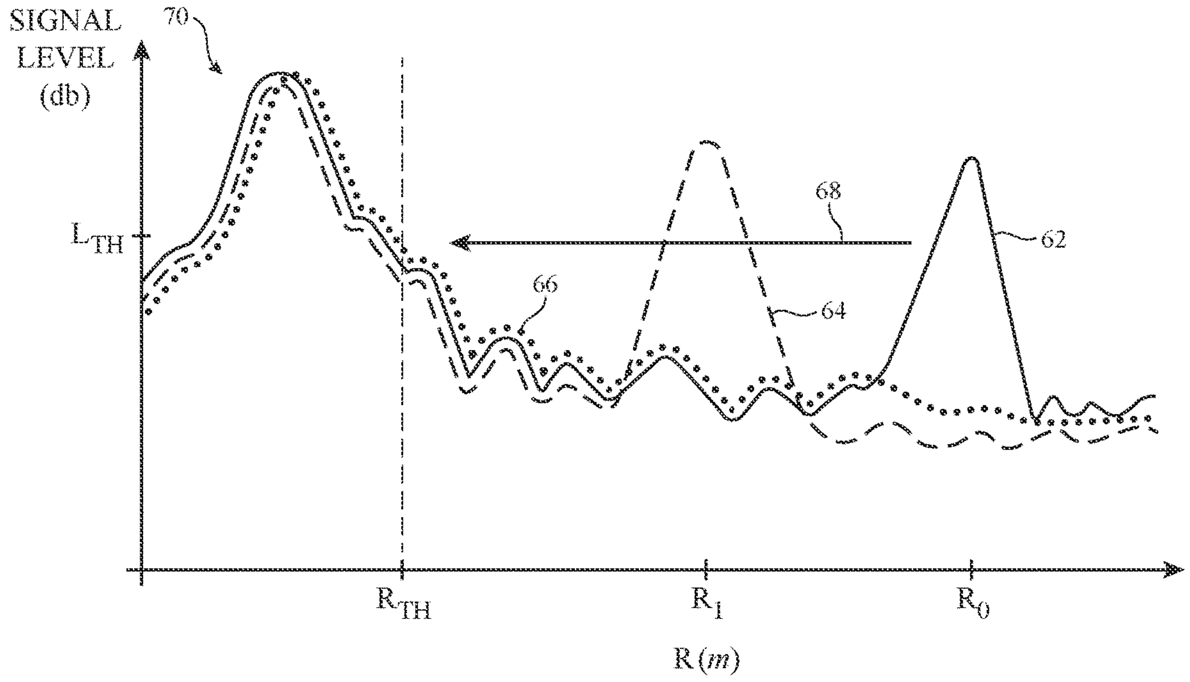
FIG. 3 is a plot of signal level as a function of range showing how an illustrative leakage signal can obscure an external object within a threshold range in accordance with some embodiments.

If care is not taken, the presence of leakage signal SIGLEAK can obscure measurements of range R and thus detection of target 42 at relatively close distances (e.g., distances less than a threshold range $R_{TH}$). FIG. 3 is a plot of the signal level of the received signal as a function of range R produced from an object in the vicinity of device 10 (e.g., as generated by sensing receiver 56 upon processing the beat signal SIGB output by de-chirp mixer 54). The sensing receiver may, for example, perform target detection on target 42 (e.g., may detect that target 42 is present at the corresponding range R) when the signal is at a level exceeding threshold level $L_{TH}$.

Curve 62 of FIG. 3 plots the signal level when target 42 is at a first range $R=R_0$ from device 10. As shown by curve 62, the signal detected by sensing receiver 56 may have a peak exceeding threshold level $L_{TH}$ at range $R_0$, corresponding to the reflected signal 36 scattered off target 42 at range $R_0$ and back towards device 10. Curve 62 also has a signal peak 70 produced by leakage signal SIGLEAK (e.g., a portion of beat signal SIGB produced earlier in time than the peak at range $R_0$ since the leakage signal passes onto the receive path before the reflected signal is received at receive antenna 30RX). In other words, the first few range bins of the radar field of view is primarily dominated by leakage signal energy (e.g., signal peak 70 corresponds to a portion of beat signal SIGB that is dominated by leakage signal SIGLEAK, such that at least half of the signal peak is produced by the leakage signal).

Curve 64 plots the signal level when target 42 is at a second range $R=R_1$ that is closer than range $R_0$. As shown by curve 64, the signal detected by sensing receiver 56 may have a peak exceeding threshold level $L_{TH}$ at range $R_1$, corresponding to the reflected signal 36 scattered off target 42 at range $R_1$ and back towards device 10. Curve 64 also has the signal peak 70 produced by leakage signal SIGLEAK. The signal peak produced by the received reflected signal may continue to move towards signal peak 70 as target 42 moves closer to device 10 (as shown by arrow 68).

Once target 42 has moved sufficiently close to device 10 (e.g., within threshold range $R_{TH}$), the signal peak 70 from leakage signal SIGLEAK can hide, obscure, or mask the signal peak produced by the reflected signals. Curve 66 plots the signal level when target 42 is within threshold range $R_{TH}$ from device 10. As shown by curve 66, any signal peak produced by reflection off target 42 is absorbed into or obscured by the signal peak 70 produced by leakage signal SIGLEAK, which can be orders of magnitude stronger than the signal peak produced by reflection. As such, if care is not taken, sensing circuitry 28 will be unable to detect the presence of target 42 within threshold range $R_{TH}$ due to the presence of leakage signal SIGLEAK. Threshold range $R_{TH}$ may be approximately 2 cm, 1 cm, 3 cm, 1-5 cm, 2-4 cm, 1-10 cm, 0.5-5 cm, or other relatively short-range distances from device 10.

In some implementations, the sensing circuitry includes an energy-based detector that attempts to detect target 42 within threshold range $R_{TH}$ by canceling out (e.g., removing the energy of) the leakage signal LEAKSIG in the beat signal. However, performing leakage signal cancellation can be unreliable, can require time-consuming calibration steps, and can require additional (e.g., dedicated) signal cancellation hardware and/or post processing logic, thereby increasing device cost, power consumption, space consumption, and/or complexity (particularly because the leakage signal can be orders of magnitude higher than the energy reflected from target 42).

To perform target detection on target 42 within threshold range $R_{TH}$ while mitigating these issues, sensing receiver 56 may perform motion-based detection on beat signal SIGB without cancellation of leakage signal SIGLEAK. Whereas energy-based detection involves the classification of energy at the sensing receiver to either be generated by target 42 or noise, motion-based detection involves the detection of signal fluctuations over time (e.g., power and/or phase changes over time) and classification of the fluctuations as either being generated by target 42 or noise. In other words, sensing circuitry 28 may perform target detection based at least in part on the leakage signal SIGLEAK in the beat signal SIGB passed to sensing receiver 56.

Leakage signal SIGLEAK is very stable (e.g., exhibits minimal phase and/or power fluctuations over time) in the absence of a moving or vibrating target within threshold range $R_{TH}$ from wireless circuitry 24. As such, a beat signal SIGB that includes only leakage and no target reflection will also be very stable in phase and/or power over time. On the other hand, the composite signal received at sensing receiver 56 (e.g., beat signal SIGB, including contributions from leakage signal SIGLEAK and reflected signals 36) will have greater fluctuations (changes) in phase and/or power over time when a moving or vibrating target is within threshold range $R_{TH}$ from wireless circuitry 24. Moreover, the motion/vibration pattern of the target may induce temporal and/or spatial correlations by modulating the phase and/or power of reflected signals 36.

Motion-based detection using sensing receiver 56 attempts to infer the existence of a moving/vibrating target within the field of view of wireless circuitry 24 by monitoring the received phase and/or power time series signals and compares the signals to highly stable phase and/or power signals that occur in the absence of such targets. The motion-based detection is performed in the same signal space as leakage signal SIGLEAK for ranges within threshold range $R_{TH}$ without any attempt to filter or cancel out leakage signal SIGLEAK. Targets that are moving or vibrating are animate objects and are potentially subject to regulatory requirements on emitted or absorbed radiation (e.g., when the animate objects are a body part). To maximize regulatory compliance and/or safety, device 10 may assume any animate object within threshold range $R_{TH}$ is subject to regulatory requirements on emitted or absorbed radiation (e.g., are a body part) if desired.

Figure 4:
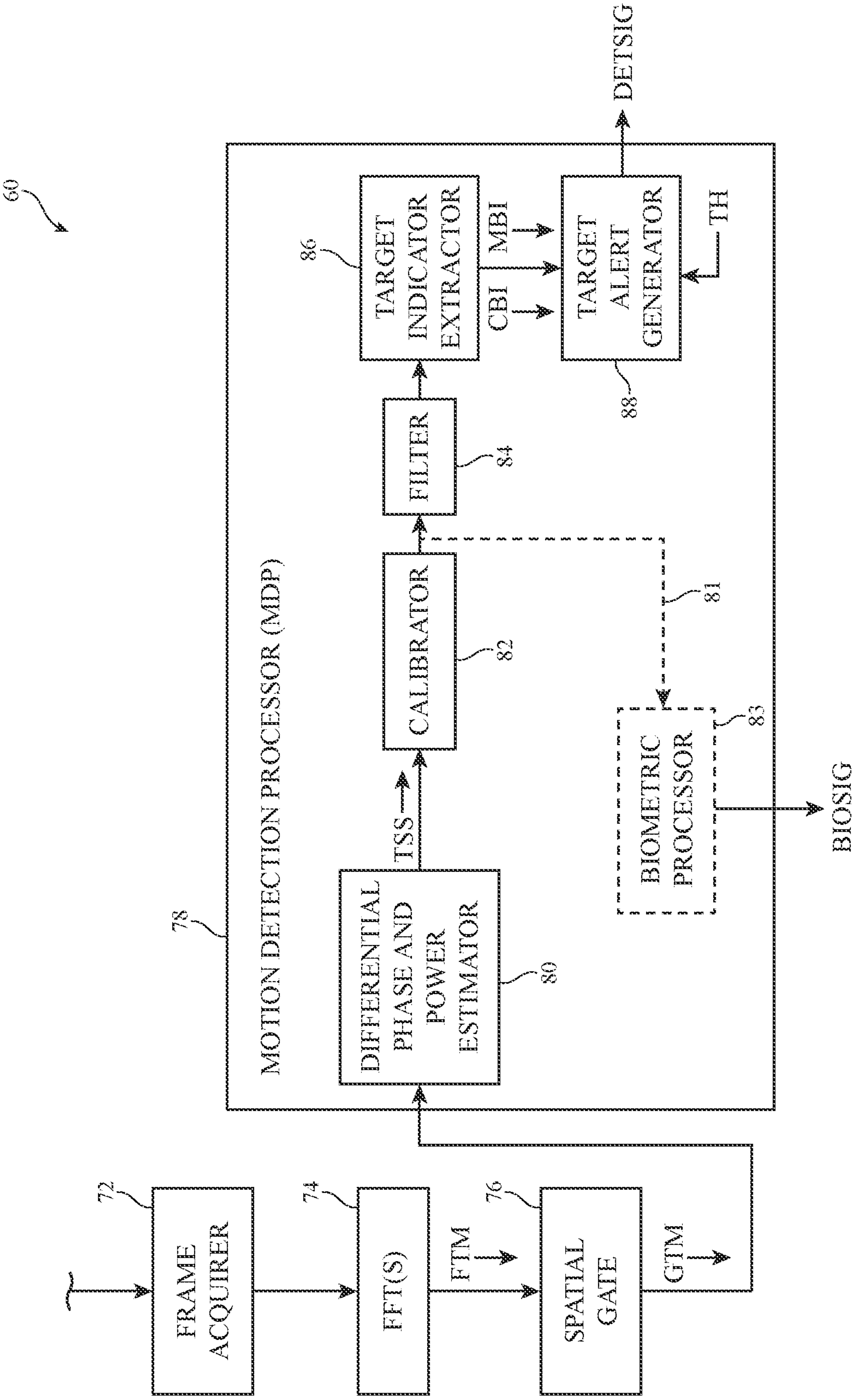
FIG. 4 is a circuit diagram of an illustrative sensing receiver having a motion detection processor in accordance with some embodiments.

FIG. 4 is a diagram showing how post processing circuitry 60 in sensing circuitry 56 may include circuitry that performs motion-based target detection on target 42 without cancelling out leakage signal SIGLEAK (e.g., motion-based target detection that is based at least in part on leakage signal SIGLEAK).

As shown in FIG. 4, post processing circuitry 60 may include frame acquisition circuitry such as frame acquirer 72 (sometimes also referred to herein as frame acquisition block 72, frame acquisition engine 72, or frame acquisition unit 72), fast Fourier transform (FFT) circuitry 74 (e.g., one or more FFT circuits, blocks, engines, or units), spatial gating circuitry such as spatial gate 76 (sometimes also referred to herein as spatial gating block 76, spatial gating engine 76, or spatial gating unit 76), and close range motion detection processing circuitry such as motion detection processor (MDP) 78 (sometimes also referred to herein as motion detector 78, ultra-short range motion detector 78, motion detection engine 78, or motion detection unit 78).

The input of frame acquirer 72 may be coupled to the output of ADC 58 (FIG. 2). The output of frame acquirer 72 may be coupled to the input of FFT(s) 74. The output of FFT(s) 74 may be coupled to the input of spatial gate 76. The output of spatial gate 76 may be coupled to the input of MDP 78. MDP 78 may generate and output detection signal DETSIG. If desired, spatial gate 76 may be omitted. The blocks, units, engines, circuitry, elements, and/or components of or within frame acquirer 72, FFT(s) 74, spatial gate 76, and MDP 78 as described herein may be implemented in hardware (e.g., digital logic gates, circuit components, baseband circuitry, integrated circuit (IC) chips, application specific integrated circuits (ASICs), one or more processors, etc.), firmware, and/or software (e.g., as executed by one or more processors such as baseband processing circuitry, an application processor, and/or other processing circuitry).

MDP 78 may include differential phase and power estimation circuitry such as differential phase and power estimator 80 (sometimes also referred to herein differential phase and power estimation block 80, differential phase and power estimation engine 80, or differential phase and power estimation unit 80), calibration circuitry such as calibrator 82 (sometimes also referred to herein as calibration block 82, calibration engine 82, or calibration unit 82), filter circuitry such as filter 84 (sometimes also referred to herein as filter block 84, filter engine 84, or filter unit 84), target indicator extraction circuitry such as target indicator extractor 86 (sometimes also referred to herein as target indicator extraction engine 86, target indicator extraction block 86, or target indicator extraction unit 86), and target alert generation circuitry such as target alert generator 88 (sometimes also referred to herein as target alert generation engine 88, target alert generation block 88, or target alert generation unit 88). If desired, MDP may also include biometric processing circuitry such as biometric processor 83.

The input of differential phase and power estimator 80 may be coupled to the output of spatial gate 76. The output of differential phase and power estimator 80 may be coupled to the input of calibrator 82. The output of calibrator 82 may be coupled to the input of filter 84. If desired, the output of calibrator 82 may also be coupled to the input of biometric processor 83 over path 81. If desired, path 81 and biometric processor 83 may be omitted. The output of filter 84 may be coupled to the input of target indicator extractor 86. The output of target indicator extractor 86 may be coupled to the input of target alert generator 88. Target alert generator 88 may receive one or more threshold values TH and may output detection signal DETSIG.

During target detection operations, beat signal SIGB is received at ADC 58 (FIG. 2) from de-chirp mixer 54. Beat signal SIGB includes components/contributions from both leakage signal SIGLEAK and the reflected signals 36 received external objects such as target object 42. ADC 58 converts beat signal SIGB into the digital domain and provides the digital beat signal to frame acquirer 72. Frame acquirer 72 may, for example, package or compile the digital beat signal into a corresponding radar data cube. FFT(s) 74 may receive the digital beat signal (e.g., the radar data cube) from frame acquirer 72.

FFT(s) 74 may generate a full target map FTM based on the received digital beat signal (e.g., the radar data cube). For example, FFT(s) 74 may perform one or more FFTs on each orthogonal dimension of the radar data cube (e.g., slow time (chirps), fast time (ADC samples), and antennas when the sensing signals are conveyed by an array of antennas). FFT processing is just one illustrative method of processing the received signal when sensing circuitry 28 is implemented using an FMCW architecture. This processing may be adapted to other types of radar sensing architectures. Full target map FTM is a complex-valued target map across the whole spatial field of view (FOV) of wireless circuitry 24. Full target map FTM maps the radar reflections from external objects (e.g., targets) that are received at sensing receiver 56 from different points across the FOV (e.g., where each point in the map is identifies corresponding reflection point properties such as range, angle Doppler shift, power, and/or phase information).

Spatial gate 76 may receive full target map FTM from FFT(s) 74. Spatial gate 76 may generate a gated target map GTM based on full target map FTM. Gated target map GTM may represent only a portion or subset of the spatial FOV represented by full target map FTM. For example, spatial gate 76 may select a portion or subset of the FOV from full target map FTM and may output the selected portion or subset as gated target map GTM. The size and position of the spatial gate applied to full target map FTM and thus the size and position of gated target map GTM depends on the range resolution, angular resolution, maximum unambiguous range and angle parameters of the radar (e.g., threshold range $R_{TH}$ and/or corresponding angular information), and/or the location and spatial dimensions of target 42.

Spatial gate 76 may apply spatial gating across one or multiple dimensions of full target map FTM, such as range, angle (e.g., azimuth and/or elevation), and/or Doppler space. If desired, spatial gate 76 may generate multiple gated target maps from different respective portions of full target map FTM (e.g., for parallel target detection across different regions of the full FOV). FIG. 4 illustrates a simplest case in which spatial gate 76 outputs only a single gated target map GTM for the sake of clarity. Spatial gate 76 may provide gated target map GTM to differential phase and power estimator 80 in MDP 78. Alternatively, spatial gate 76 may be omitted, FFT(s) 74 may provide full target map FTM to differential phase and power estimator 80, and MDP 78 may perform target detection based on full target map FTM.

Differential phase and power estimator 80 may measure (e.g., detect, estimate, generate, compute, calculate, compute, output, identify, etc.) one or more statistics associated with the change in the phase and/or the change in the power of the reflection points that fall within the spatial gate of full target map FTM (e.g., the reflection points within gated target map GTM) using all or a subset of the resolution bins within the spatial gate. As one example, differential phase and power estimator 80 may first select the dominant reflection point(s) within gated target map GTM and may use the selected reflection point(s) to estimate the phase and/or power of the signal in each radar frame. Differential phase and power estimator 80 may perform differential processing by computing the change (difference) in phase and/or power of the reflections across consecutive time periods for the selected resolution bins within gated target map GTM. The differential processing can be performed by computing the difference of complex reflection coefficients, the difference of phase values, and/or the difference of power values across time periods in gated target map GTM, as examples. If desired, differential phase and power estimator 80 may perform phase unwrapping to detect the time instances when the estimated phase wraps around and may apply a correction step to remove phase jumps.

Differential phase and power estimator 80 may generate (output) time series signals TSS based on gated target map GTM. Time series signals TSS may include a power time series and/or a phase time series. The phase time series identifies changes or fluctuations over time in phase at the points within gated target map GTM. The power time series identifies changes or fluctuations over time in power at the points within gated target map GTM. The differential processing performed by differential phase and power estimator ignores the absolute phase and the absolute power of each of the points. This is unlike energy-based target detection, which processes the absolute power and phase of each of the points.

Calibrator 82 may receive time series signals TSS from differential phase and power estimator 80. Calibrator 82 may adjust/calibrate time series signals TSS to compensate for potential signal drifts that are not caused by targets in the FOV of wireless circuitry 24 such as signal drifts due to temperature changes. Calibrator 82 may, for example, compare the phase and/or power time series from time series signals TSS to that of a controlled test (e.g., as generated during testing or manufacture of device 10 under controlled conditions) and may subtract the values of the time series given by the controlled test from the value of the time series received from differential phase and power estimator 80. Calibrator 82 may, if desired, be implemented without feedback loops or complex logic. Calibration may be limited to steep temperature variations (e.g., at or shortly after startup of device 10) or may be limited to certain time durations if desired. The calibration of phase and/or power time series may be different for different spatial gates of the FOV (e.g., for different gated target maps GTM).

Filter 84 may receive the calibrated time series signals TSS from filter 84. Filter 84 may perform linear filtering on time series signals TSS to remove residual drifts or biases in the signals and/or to remove unwanted spectral features in the signals (e.g., as generated by factors other than the motion of targets within the FOV of the radar). Additional filtering operations such as denoising and/or bias removal may also be performed. As one example, filter 84 may be a linear high pass filter that rejects DC values of the phase and/or power time series signals.

Target indicator extractor 86 may receive the filtered time series signals from filter 84. Target indicator extractor 86 may extract a set of statistics associated with the existence/presence of a moving (animate) target 42 from the phase and/or power time series in time series signals TSS. The statistics may be associated with bulk motion of target 42 within the FOV over a relatively short time window (sometimes referred to herein as motion indicator time window MIW) and/or micro-motion of target 42 within the FOV over a relatively long time window (sometimes referred to herein as correlation indicator time window CIW).

Target indicator extractor 86 may, for example, include a motion-based target indicator extractor that generates (e.g., extracts, computes, calculates, outputs, generates, etc.) a motion-based indicator MBI based on time series signals TSS. Motion-based indicator MBI may be as simple as a moving average window (motion indicator time window MIW) applied to the energy of the phase and/or power time series signals. This is because motion of target 42 that falls within the spatial gate of the radar will generate fluctuations in the differential phase and/or power time series, leading to more energy in those signals. The value of motion-based indicator MBI varies over time and may be higher when there is more motion of target 42 (e.g., greater fluctuations in the power and/or phase time series in time series signals TSS) over motion indicator time window MIW than when there is less motion of target 42 over motion indicator time window MIW.

Target indicator extractor 86 may also include a correlation-based target indicator extractor that generates a correlation-based indicator CBI based on time series signals TSS. Correlation-based indicator CBI may refer to extraction periods with high temporal correlation in the radar signals. The correlation-based target indicator extractor may operate in the temporal and/or spatial domain (e.g., correlation across spatial gates). In a simplest case, correlation-based indicator CBI may correspond to the phase and/or power time series of time series signals TSS that fall within a recent fixed-duration time window (e.g., correlation indicator time window CIW) relative to the time-series signals that appeared prior to that window. Correlation indicator time window CIW may, for example, be longer than motion indicator time window MIW. The value of correlation-based indicator CBI varies over time and may be higher when there is more motion (e.g., micro-motion) of target 42 (e.g., fluctuations in the power and/or phase time series in time series signals TSS) over correlation indicator time window CIW than when there is less motion of target 42 over correlation indicator time window CIW.

Target alert generator 88 may receive correlation-based indicator CBI and motion-based indicator MBI from target indicator extractor 86. Target alert generator 88 may generate detection signal DETSIG based on correlation-based indicator CBI and motion-based indicator MBI. For example, target alert generator 88 may perform binary hypothesis testing on the target indicator signals output by target indicator extractor 86 (correlation-based indicator CBI and motion-based indicator MBI) to generate detection signal DETSIG (e.g., indicative of whether an animate target 42 is present within threshold distance $R_{TH}$ or not). Detection signal DETSIG may, for example, have a first value when correlation-based indicator CBI and/or motion-based indicator MBI identify that an animate target 42 is present within threshold distance $R_{TH}$ and may have a second value when correlation-based indicator CBI and/or motion-based indicator MBI identify that an animate target 42 is absent within threshold distance $R_{TH}$.

Target alert generator 88 may, for example, apply a thresholding operator to correlation-based indicator CBI and/or motion-based indicator MBI (e.g., by comparing correlation-based indicator CBI and/or motion-based indicator MBI to one or more thresholds TH). If/when correlation-based indicator CBI and/or motion-based indicator MBI exceed the one or more thresholds TH, target alert generator 88 may generate a detection signal DETSIG identifying that an animate target 42 has been detected within threshold range $R_{TH}$. On the other hand, if/when correlation-based indicator CBI and/or motion-based indicator MBI are less than the one or more thresholds TH, target alert generator 88 may generate a detection signal DETSIG identifying that an animate target 42 has not been detected within threshold range $R_{TH}$. Target alert generator 88 may compare correlation-based indicator CBI and motion-based indicator MBI to the same threshold TH or may compare correlation-based indicator CBI and motion-based indicator MBI to different respective thresholds TH.

Threshold(s) TH may determine the false positive rate and false negative rate of MDP 78. Control circuitry 14 (FIG. 1) may, if desired, adjust threshold(s) TH over time (e.g., to adjust the false positive or false negative rate). As one example, control circuitry 14 may set threshold(s) TH based on statistics associated with the target indicator signals (e.g., using a Neyman-Pearson-type criterion). Different thresholds may be applied to different spatial gates (gated target maps GTM) if desired.

In this way, MDP 78 may detect the presence of an animate target 42 within threshold distance $R_{TH}$ based at least in part on the leakage signal SIGLEAK in beat signal SIGB (e.g., because leakage signal SIGLEAK is not canceled out or removed from the signal at any point between receive path 32RX (FIG. 2) and target alert generator 88) and by leveraging fluctuations in phase and/or power over time rather than absolute phase or power (e.g., energy levels). This allows sensing circuitry 28 to detect target 42 within threshold range $R_{TH}$ based on its own radar-detected motion, despite potential masking of reflected signal from target 42 by leakage signal SIGLEAK. In addition, by retaining leakage signal SIGLEAK within the received signal throughout post processing, costly hardware dedicated to leakage signal cancellation may be omitted from device 10.

Micro-motions of animate targets due to biological activities of the body including respiratory and/or cardiovascular function can modulate the phase and/or power time series signals associated with different spatial gates that include body parts. If desired, biometric processor 83 may perform biometric processing on time signals TSS received over path 81. Biometric processor 83 may generate, extract, identify, or sense any desired biometric information associated with target 42 from time series signals TSS. Biometric processor 83 may generate or output biometric signal BIOSIG that identifies the biometric information extracted from time series signals TSS. Biometric signal BIOSIG may include a biometric time series, biometric rates (e.g., heart rates, breathing rates, cardiac signals, etc.), blood oxygen level, biometric waveforms such as a breathing waveform or heart waveform, blood pressure information, and/or any other desired biometric information. Control circuitry 14 may perform any desired operations based on biometric signal BIOSIG. Biometric processor 83 may be omitted if desired.

Figure 5:
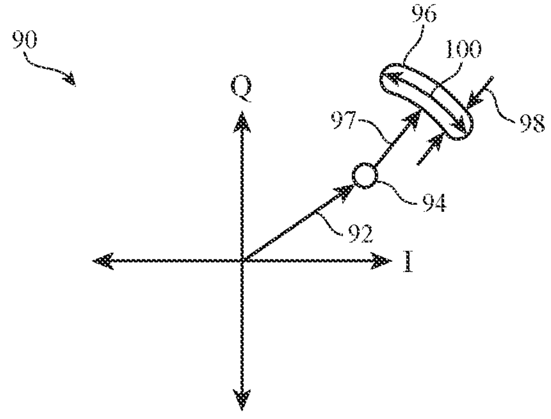
FIG. 5 is a constellation diagram of a signal input to an illustrative motion detection processor in the presence and absence of an external object within a threshold range in accordance with some embodiments.

FIG. 5 shows a constellation diagram 90 of illustrative signals that may be received by differential phase and power estimator 80 in the presence and absence of an animate target object 42 within threshold distance $R_{TH}$ (e.g., for a given point within gated target map GTM). The horizontal axis of FIG. 5 corresponds to the in-phase (I) component of the signal whereas the vertical axis corresponds to the quadrature-phase (Q) component of the signal.

Region 94 of diagram 90 illustrates the signal in the absence of target 42. Region 94 is displaced from the origin by vector 92. Vector 92 represents the contribution of leakage signal SIGLEAK in the signal provided to differential phase and power estimator 80. The magnitude of vector 92 represents the power of the leakage signal and the angle of vector 92 relative to the horizontal axis represents the phase of the leakage signal. The finite width of region 94 is caused by noise in the system. In energy-based target detectors, leakage signal SIGLEAK and thus vector 92 is canceled out from the signal prior to target extraction, causing region 94 to overlap the origin.

Region 96 of diagram 90 illustrates the signal in the presence of an animate target 42. Region 96 is displaced from region 94 and the tip of vector 92 by vector 97. Vector 97 represents the reflected signal 36 (FIG. 2) back-scattered off of target 42. The magnitude of vector 97 corresponds to the power of the reflected signal. The angle of vector 97 relative to the horizontal axis corresponds to the phase of the reflected signal. The width 98 of region 96 is caused by noise. Region 96 may also have a length 100 that is produced by the motion of target 42 as an animate object. Since leakage signal SIGLEAK is not canceled out of the signal, differential phase and power estimator 80 receives the signal as depicted by region 96, offset from the origin by the sum of vectors 92 and 97.

Figure 6:
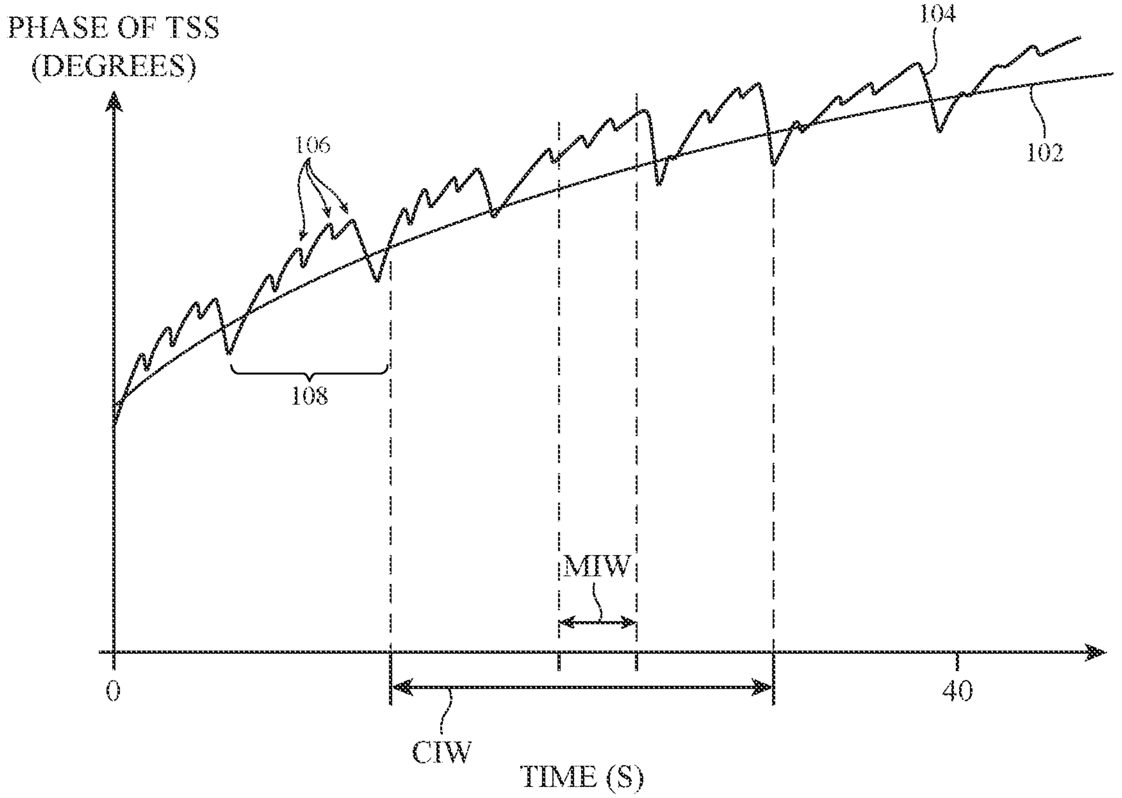
FIG. 6 is a plot of phase time series signals that may be generated by an illustrative differential phase and power estimator of a motion detection processor in the presence and absence of an external object within a threshold range in accordance with some embodiments.

FIG. 6 shows a plot of an illustrative phase time series in time series signals TSS as generated by differential phase and power estimator 80 based on the signals associated with region 96 of FIG. 5. The horizontal axis of FIG. 6 plots time on the order of tens of seconds. The vertical axis plots the phase of time series signals TSS (e.g., the phase time series output by differential phase and power estimator 80).

Curve 102 plots the phase time series in the absence of target 42. Differential phase and power estimator 80 may, for example, generate the phase time series depicted by curve 102 based on the signal associated with region 94 of FIG. 5. As shown by curve 102, curve 102 is smooth because there are no fluctuations in phase in the absence of target 42 (e.g., because leakage signal SIGLEAK is stable in phase).

Curve 104 plots the phase time series in the presence of an animate target 42. Differential phase and power estimator 80 may, for example, generate the phase time series depicted by curve 104 based on the signal associated with region 96 of FIG. 5. As shown by curve 104, the phase time series exhibits fluctuations or changes in phase over one or more time periods (windows).

For example, the phase time series may include relatively short time-scale fluctuations 106 (sometimes referred to herein micro-fluctuations 106) over relatively long time periods. Micro-fluctuations 106 may, for example, be produced in or modulated onto reflected signals 36 by micro-motions of target 42. The micro-motions may, for example, include modulations from the heartbeat, breathing, and/or pulse of target 42 and/or other involuntary or non-center of mass motions of target 42.

Additionally or alternatively, the phase time series may include bulk fluctuations 108 over shorter time frames. Bulk fluctuations 108 may, for example, be produced in or modulated onto reflected signals 36 by bulk (e.g., center-of-mass) motions such as voluntary motions of target 42 and/or other motions that lead to the displacement of target 42. Bulk fluctuations 108 can be reliably detected over relatively short time scales such as over motion indicator time window MIW. Micro-fluctuations 106 may be detected over longer time scales such as over correlation indicator time window CIW, which is longer than motion indicator time window MIW. Additionally or alternatively, differential phase and power estimator 80 may generate similar power time series curves in time series signals TSS (not shown).

After calibration by calibrator 82 and filtering by filter 84 of FIG. 4, target indicator extractor 86 may generate motion-based indicator MBI based on the fluctuations of the time-series signals TSS over motion indicator time window MIW (e.g., bulk fluctuations 108 in the phase series associated with curve 104 or similar bulk fluctuations in the power series of time series signals TSS). Additionally or alternatively, target indicator extractor 86 may generate correlation-based indicator CBI based on the fluctuations of the time-series signals TSS over correlation indicator time window CIW (e.g., micro-fluctuations 106 in the phase series associated with curve 104 or similar fluctuations in the power series of time series signals TSS). Motion indicator time window MIW may, for example, be less than 1 second, 0.1-5 seconds, 1-3 seconds, 0.2-3 seconds, or other durations that are shorter than correlation indicator time window CIW. Correlation indicator time window CIW may, for example, be 10 seconds, 20 seconds, 15 seconds, 5-15 seconds, 5-20 seconds, 30 seconds, 10-30 seconds, or other durations.

Figure 7:
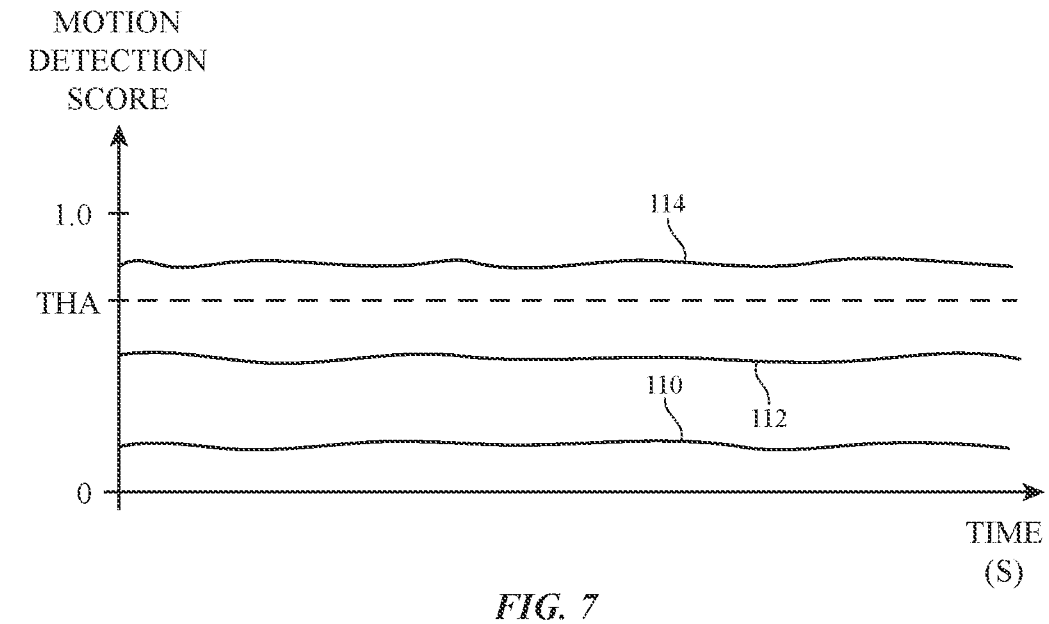
FIG. 7 is a plot of a motion detection score as a function of time that may be generated by an illustrative target indicator extractor of a motion detection processor in the presence of an external object at different ranges in accordance with some embodiments.

FIG. 7 is a plot of a motion detection score associated with motion-based indicator MBI as a function of time as produced in response to target object 42 at different levels of target fluctuations in a specific spatial gate. For example, curve 110 plots the motion detection score under very low levels of signal (e.g., phase and/or power) fluctuation. Curve 112 plots the motion detection score under a higher level of signal fluctuation (e.g., as produced by target bulk motion). Curve 114 plots the motion detection score under an even higher level of target fluctuation (e.g., bulk motion). Curves 110-114 may be generated by target alert generator 88 (FIG. 4) based on motion-based indicator MBI and may be compared to a first threshold TH such as threshold THA. If/when motion-based indicator MBI exceeds threshold THA (e.g., as shown by curve 114), the target alert generator may output a signal indicative of the detection of the target object within the corresponding spatial gate.

Figure 8:
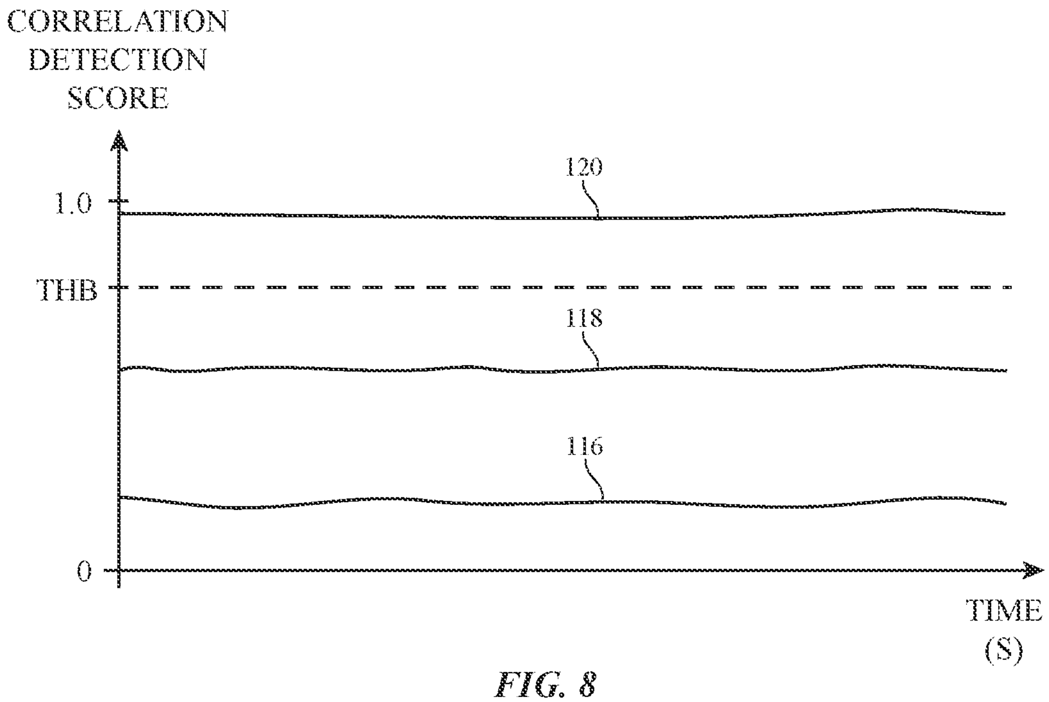
FIG. 8 is a plot of a correlation detection score as a function of time that may be generated by an illustrative target indicator extractor of a motion detection processor in the presence of an external object at different ranges in accordance with some embodiments.

FIG. 8 is a plot of a correlation detection score associated with correlation-based indicator CBI as a function of time as produced in response to target object 42 at different levels of target fluctuations within a specific spatial gate. For example, curve 116 plots the correlation detection score under very low levels of signal (e.g., phase and/or power) fluctuation. Curve 118 plots the correlation detection score under a higher level of signal fluctuation (e.g., as produced by target micro-motion). Curve 120 plots the correlation detection score under an even higher level of signal fluctuation (e.g., micro-motion). Curves 116-120 may, for example, be generated by target alert generator 88 (FIG. 4) based on correlation-based indicator CBI and may be compared to a second threshold TH such as threshold THB. Threshold THB may be different than threshold THA or may be the same as threshold THA. If/when correlation-based indicator CBI exceeds threshold THB (e.g., as shown by curve 120), the target alert generator may output a signal indicative of the detection of the target object within the corresponding spatial gate.

The correlation detection score corresponds to the likelihood or probability (e.g., from a value of 0 to 1.0) that a target object exhibiting micro-motion on the time scale of correlation indicator time window CIW is present at or near device 10 (e.g., within threshold range $R_{TH}$). The motion detection score corresponds to the likelihood or probability that a target object exhibiting bulk motion on the time scale of motion indicator time window MIW is present at or near device 10 (e.g., within threshold range $R_{TH}$). The motion detection score, the correlation detection score, or a combination of the motion detection score and the correlation detection score may be used to determine whether an animate target 42 is present at or near device 10.

For example, target alert generator 88 may output a detection signal DETSIG identifying the detection of an animate target 42 within threshold range $R_{TH}$ if/when the motion detection score exceeds threshold THA (e.g., when the motion detection score is characterized by curve 114 of FIG. 7) and/or if/when the correlation detection score exceeds threshold THB (e.g., when the correlation detection score is characterized by curve 120 of FIG. 8). Thresholds THA and THB may be between 0.5 and 1.0, greater than 0.6, greater than 0.7, greater than 0.8, greater than 0.9, greater than 0.95, greater than 0.99, etc. Thresholds THA and/or THB may be set or adjusted to tune the false positive and false negative detection rate of sensing circuitry 28. This example is illustrative and non-limiting. In general, target alert generator 88 may use any desired comparison, combination, and/or processing logic to generate detection score DETSIG based on correlation-based indicator CBI (e.g., correlation detection score) and/or motion-based indicator MBI (e.g., motion detection score).

Figure 9:
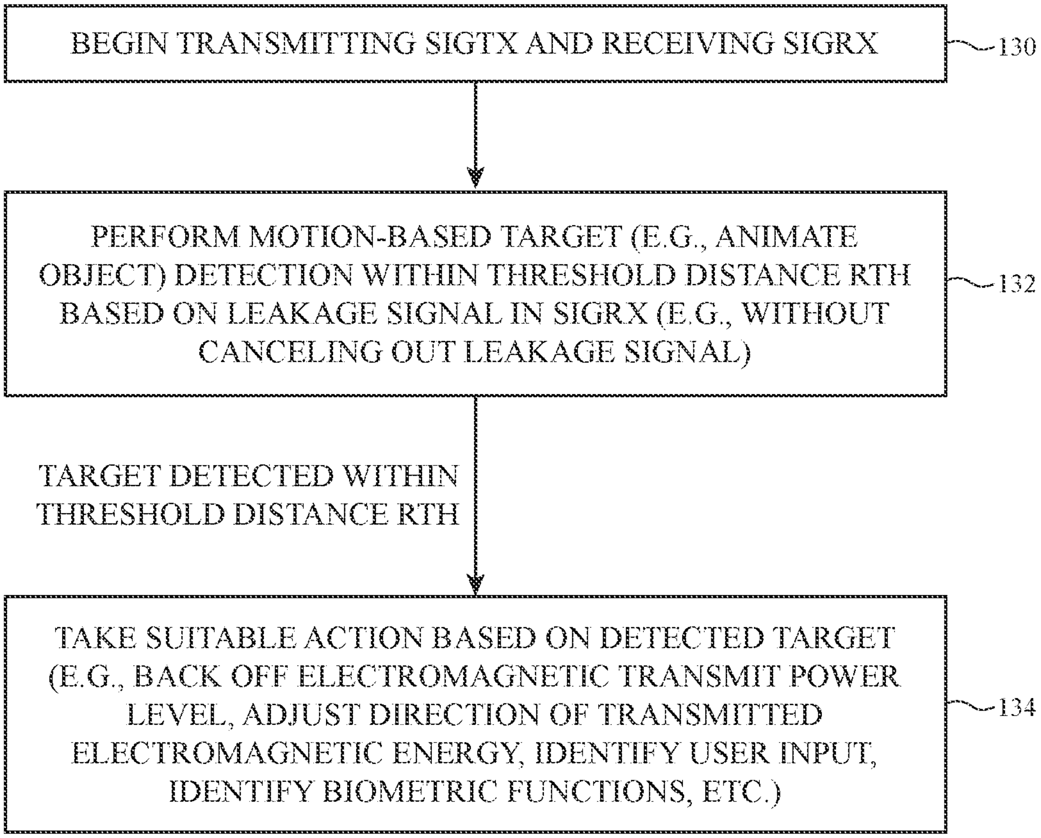
FIG. 9 is a flow chart of illustrative steps involved in performing external object detection using sensing circuitry of the type shown in FIGS. 4-8 in accordance with some embodiments.

FIG. 9 is a flow chart of illustrative steps that may be performed by sensing circuitry 28 (FIG. 2) to perform target detection (e.g., to detect an animate target 42 within threshold range $R_{TH}$). The operations of FIG. 9 may be performed prior to, after, and/or concurrent with communications circuitry 26 (FIG. 1) transmitting and/or receiving wireless communications data using one or more antennas 30.

At operation 130, sensing transmitter 44 may begin transmitting sensing signals SIGTX (e.g., chirp signals). Sensing signals SIGTX may be passed to transmit antenna 30TX over transmit path 32TX. Some of the sensing signals SIGTX may be routed to de-chirp mixer 54 over de-chirp path 52. Transmit antenna 30TX may transmit sensing signals SIGTX into free space as radar signals 34. Some of the sensing signals SIGTX on transmit path 32TX and/or transmitted by transmit antenna 30TX may leak onto receive path 32RX as leakage signal SIGLEAK.

Some of radar signals 34 reflect off of the surroundings of device 10 (e.g., target 42) as reflected signals 36. Receive antenna 30RX receives reflected signals 36 and passes the reflected signals to de-chirp mixer 54. De-chirp mixer 54 receives signal SIGRX that includes contributions from both leakage signal SIGLEAK and reflected signal 36. De-chirp mixer 54 generates beat signal SIGB based on the sensing signal SIGTX received over de-chirp path 52 and the received signal SIGRX. Sensing receiver 56 receives beat signal SIGB. Sensing circuitry 28 may continue transmitting sensing signals SIGTX, receiving reflected signals 36, and generating beat signals SIGB while processing the remaining operations of FIG. 9.

At operation 132, sensing receiver 56 may perform motion-based target detection (e.g., animate object detection) on target 42 based on beat signal SIGB. Sensing receiver 56 performs the motion-based target detection without canceling or removing leakage signal SIGLEAK. As such, sensing receiver 56 performs the motion-based target detection based at least in part on leakage signal SIGLEAK (e.g., by detecting fluctuations in beat signal SIGB which are at least in part indicative of fluctuations in leakage signal SIGLEAK). Sensing receiver 56 may perform the motion-based target detection over a wide variety of ranges R. However, performing motion-based detection based at least in part on leakage signal SIGLEAK also allows sensing receiver 56 to perform target detection on target 42 when target 42 is within threshold range $R_{TH}$ of wireless circuitry 24, even though the signal peak from leakage signal SIGLEAK would otherwise mask the signal peak from reflected signals 36 when energy-based detection is used (e.g., as shown by curve 66 of FIG. 3).

If/when sensing receiver 56 detects that target 42 is present within threshold range $R_{TH}$ of device 10, sensing receiver 56 outputs a detection signal DETSIG identifying the detection and processing may proceed to operation 134. This is illustrative and non-limiting. In general, processing may proceed to operation 134 in response to detection of any desired characteristic of target 42 as sensed from beat signals SIGB and/or presence of target 42 at any desired range R.

At operation 134, control circuitry 14 (FIG. 1) may take suitable action based on the detected target 42. For example, control circuitry 14 may back off (reduce) the electromagnetic transmit power level and/or maximum transmit power level of wireless circuitry 24, transmit antenna 30TX, one or more other antennas 30 in device 10, an infrared emitter, a near-infrared emitter, an optical emitter, a light source, and/or any other desired electromagnetic signal source in response to the detection of target 42 (e.g., as an animate object within threshold range $R_{TH}$). Additionally or alternatively, control circuitry 14 may turn off, power down, or disable one or more of these electromagnetic energy sources. This may help device 10 to continue to comply with regulatory requirements on electromagnetic energy exposure and/or absorption despite the close proximity of target 42 to the electromagnetic sources on device 10.

Additionally or alternatively, control circuitry 14 may adjust the direction of the transmitted electromagnetic energy (e.g., by steering a signal beam of a phased antenna array on device 10 to point away from the detected target, by steering an optical emitter to emit light in directions pointed away from the detected target, etc.). Additionally or alternatively, control circuitry 14 may identify a user input (e.g., an input gesture) associated with the detected motion of the animate target. Additionally or alternatively, control circuitry 14 may perform any desired actions based on biometric signal BIOSIG output by biometric processor 83 (FIG. 4). Control circuitry 14 and/or device 10 may perform any other desired operations based on the detection and/or detection signal DETSIG.

Figure 10:
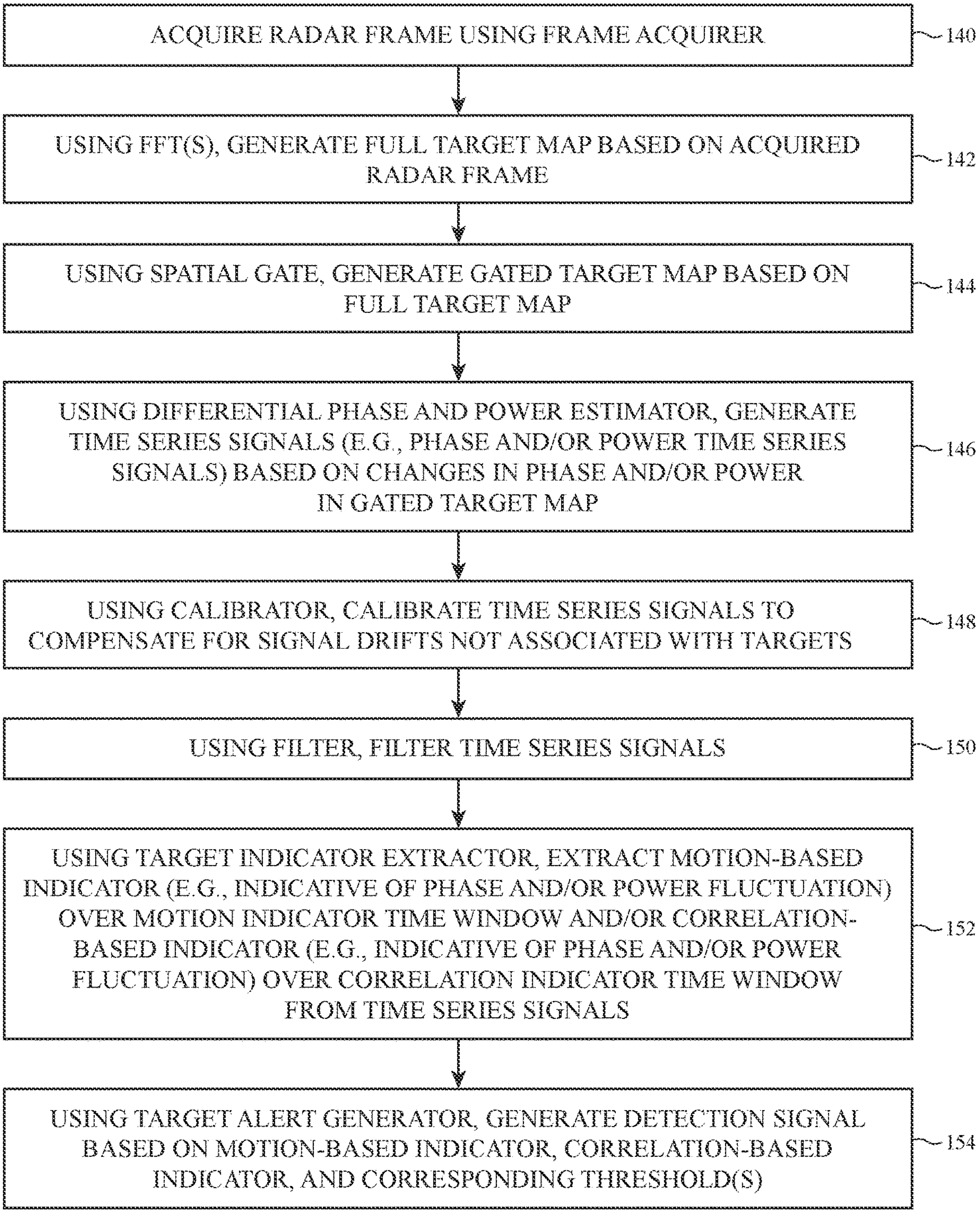
FIG. 10 is a flow chart of illustrative operations involved in performing motion-based external object detection using a sensing receiver of the type shown in FIGS. 4-8 in accordance with some embodiments.

FIG. 10 is a flow chart of illustrative operations that may be performed by post processing circuitry 60 (FIG. 4) in sensing receiver 56 (FIG. 2) while performing detection on target 42. The operations of FIG. 10 may, for example, be performed by post processing circuitry 60 while performing operation 132 of FIG. 9.

At operation 140, frame acquirer 72 may acquire (e.g., generate, output, compile, etc.) a radar frame (e.g., a radar data cube) based on the beat signals SIGB received from de-chirp mixer 54. The acquired radar frame includes contributions from leakage signal LEAKSIG.

At operation 142, FFT(s) 74 may generate full target map FTM based on the acquired radar frame. Full target map FTM includes the contributions from leakage signal LEAKSIG.

At operation 144, spatial gate 76 may generate a gated target map GTM based on full target map FTM. Gated target map GTM may correspond to a subset of the full FOV represented by full target map FTM. Gated target map GTM includes the contributions from leakage signal LEAKSIG. Points in gated target map GTM overlapping target 42 may, for example, be represented by the signal associated with region 96 of FIG. 5. Points in gated target map GTM not overlapping target 42 may, for example, be represented by the signal associated with region 94 of FIG. 5.

If desired, spatial gate 76 may generate multiple gated target maps GTM associated with different spatial regions of the full FOV and full target map FTM for parallel processing (e.g., for parallel object detection within different regions of the FOV). Alternatively, spatial gate 76 and operation 144 may be omitted and the remaining operations of FIG. 10 may be performed using full target map FTM in place of gated target map GTM.

At operation 146, differential phase and power estimator 80 may generate time series signals TSS based on changes (fluctuations) in phase and/or power over time at the points of gated target map GTM. Time series signals TSS may include a phase time series (e.g., as shown in FIG. 6) and/or a power time series. Time series signals TSS include the contribution of leakage signals LEAKSIG.

At operation 148, calibrator 82 may calibrate time series signals TSS to compensate for signal drifts not associated with external objects such as target 42. The calibrated time series signals TSS include the contribution of leakage signals LEAKSIG.

At operation 150, filter 84 may filter time series signals TSS. The filtered time series signals TSS include the contribution of leakage signals LEAKSIG.

At operation 152, target indicator extractor 86 may extract motion-based indicator MBI and/or correlation-based indicator CBI from time series signals TSS. Motion-based indicator MBI may, for example, be indicative of phase and/or power fluctuation in time series signals TSS over motion indicator time window MIW (FIG. 6). Correlation-based indicator CBI may, for example, be indicative of phase and/or power fluctuation in time series signals TSS over correlation indicator time window CIW (FIG. 6). Indicators MBI and CBI include the contribution of leakage signals LEAKSIG.

At operation 88, target alert generator 88 may generate detection signal DETSIG (sometimes also referred to as a target alert signal or simply a target alert) based on motion-based indicator MBI and/or correlation-based indicator CBI. Target alert generator 88 may generate detection signal DETSIG based on a comparison of motion-based indicator MBI and/or correlation-based indicator CBI to one or more thresholds TH. Target alert generator 88 may, for example, generate a motion detection score based on motion-based indicator MBI and may compare the motion detection score to threshold THA (e.g., as shown in FIG. 7) and/or may generate a correlation detection score based on correlation-based indicator CBI and may compare the correlation detection score to threshold THB (e.g., as shown in FIG. 8). Detection signal DETSIG may identify whether sensing circuitry 28 has detected a particular characteristic of target 42 (e.g., the presence of an animate target 42 within threshold range $R_{TH}$).

The example of FIGS. 4 and 10 in which target alert generator 88 generates detection signal DETSIG based on both motion-based indicator MBI and correlation-based indicator CBI received from target indicator extractor 86 is illustrative and non-limiting. If desired, motion-based indicator MBI and correlation-based indicator CBI may be fused at the target indicator level prior to being passed to target alert generator 88.

Figure 11:
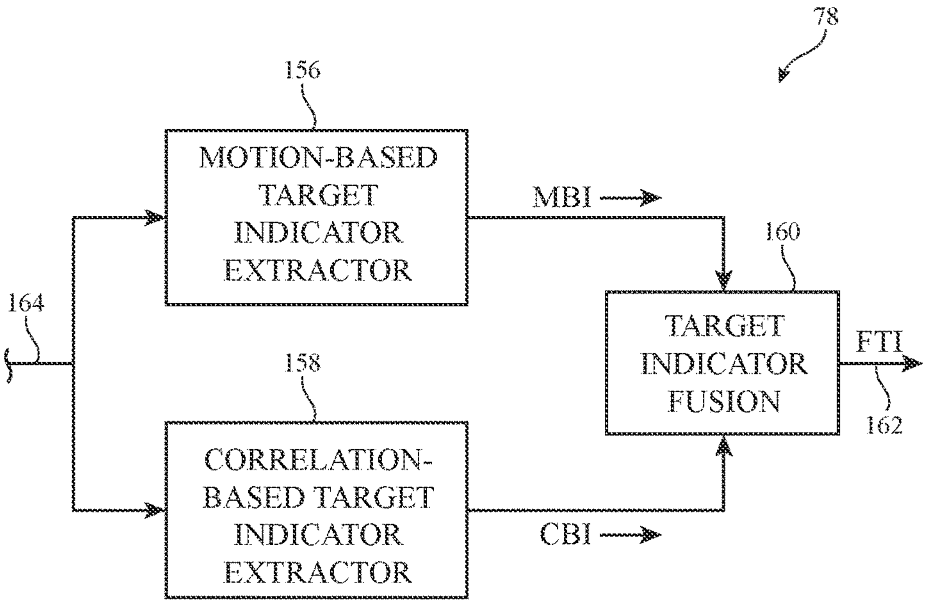
FIG. 11 is a diagram of an illustrative motion detection processor having parallel motion-based and correlation-based target indicator extractors that are fused at the target indicator level in accordance with some embodiments.

FIG. 11 is a diagram showing one example of how motion-based indicator MBI and correlation-based indicator CBI may be fused at the target indicator level prior to being passed to target alert generator 88. As shown in FIG. 11, rather than including a single target indicator extractor 86, MDP 78 may include motion-based target indicator extractor 156 and correlation-based target indicator extractor 158 coupled in parallel between input path 164 and target indicator fusion circuitry 160 (sometimes also referred to herein as target indicator fusion block 160, target indicator fusion unit 160, target indicator fusion engine 160, or target indicator fuser 160). Input path 164 may be coupled to the output of filter 84 (FIG. 4).

Motion-based target indicator extractor 156 may generate motion-based indicator MBI based on the time series signals TSS received from filter 84. Motion-based target indicator extractor 156 may pass motion-based indicator MBI to target indicator fusion circuitry 160. In parallel, correlation-based target indicator extractor 158 may generate correlation-based indicator CBI based on the time series signals TSS received from filter 84. Correlation-based target indicator extractor 158 may pass correlation-based indicator CBI to target indicator fusion circuitry 160.

Target indicator fusion circuitry 160 may use any desired combination logic to combine motion-based indicator MBI with correlation-based indicator CBI to output a fused target indicator FTI. Fused target indicator FTI may be representative of a combination of phase and/or power fluctuations over motion indicator time window MIW and/or correlation indicator time window CIW. Target indicator fusion circuitry 160 may pass fused target indicator FTI to target alert generator 88 (FIG. 4), which generates detection signal DETSIG based on fused target indicator FTI (e.g., by comparing fused target indicator FTI to one or more thresholds TH).

Figure 12:
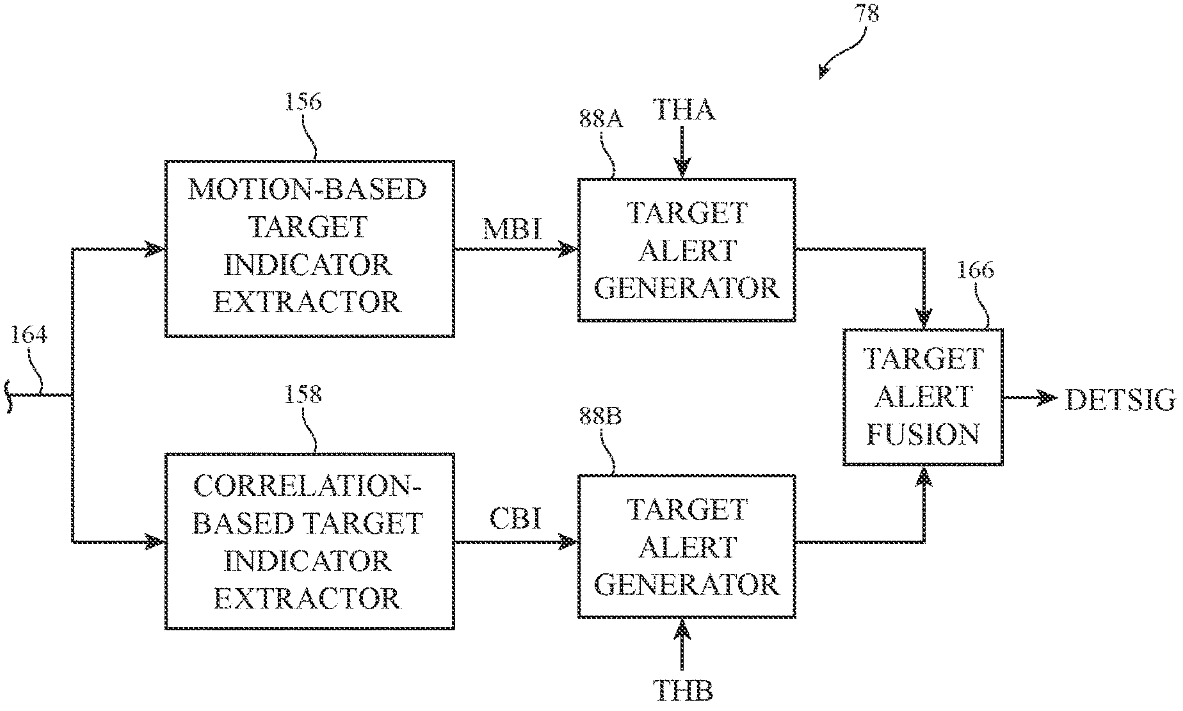
FIG. 12 is a diagram of an illustrative motion detection processor having parallel motion-based and correlation-based target indicator extractors that are fused at the target alert level in accordance with some embodiments.

Alternatively, motion-based indicator MBI and correlation-based indicator CBI may be fused at the target alert level. FIG. 12 is a diagram showing one example of how motion-based indicator MBI and correlation-based indicator CBI may be fused at the target alert level. As shown in FIG. 12, MDP 78 may include a first target alert generator 88A coupled between motion-based target indicator extractor 156 and target alert fusion circuitry 166 (sometimes also referred to herein as target alert fusion block 166, target alert fusion unit 166, target alert fusion engine 166, or target alert fuser 166). MDP 78 may also include a second first target alert generator 88B coupled between correlation-based target indicator extractor 158 and target alert fusion circuitry 166.

Target alert generator 88A may generate a first target alert signal by comparing motion-based indicator MBI to a first threshold value such as threshold THA and may pass the first target alert signal to target alert fusion circuitry 166. Target alert generator 88B may generate a second target alert signal by comparing correlation-based indicator CBI to a second threshold value such as threshold THB and may pass the second target alert signal to target alert fusion circuitry 166. Target alert fusion circuitry 166 may fuse (combine) the first and second target alert signals using any desired combination logic and may output detection signal DETSIG based on the fused target alert signals.

Figure 13:
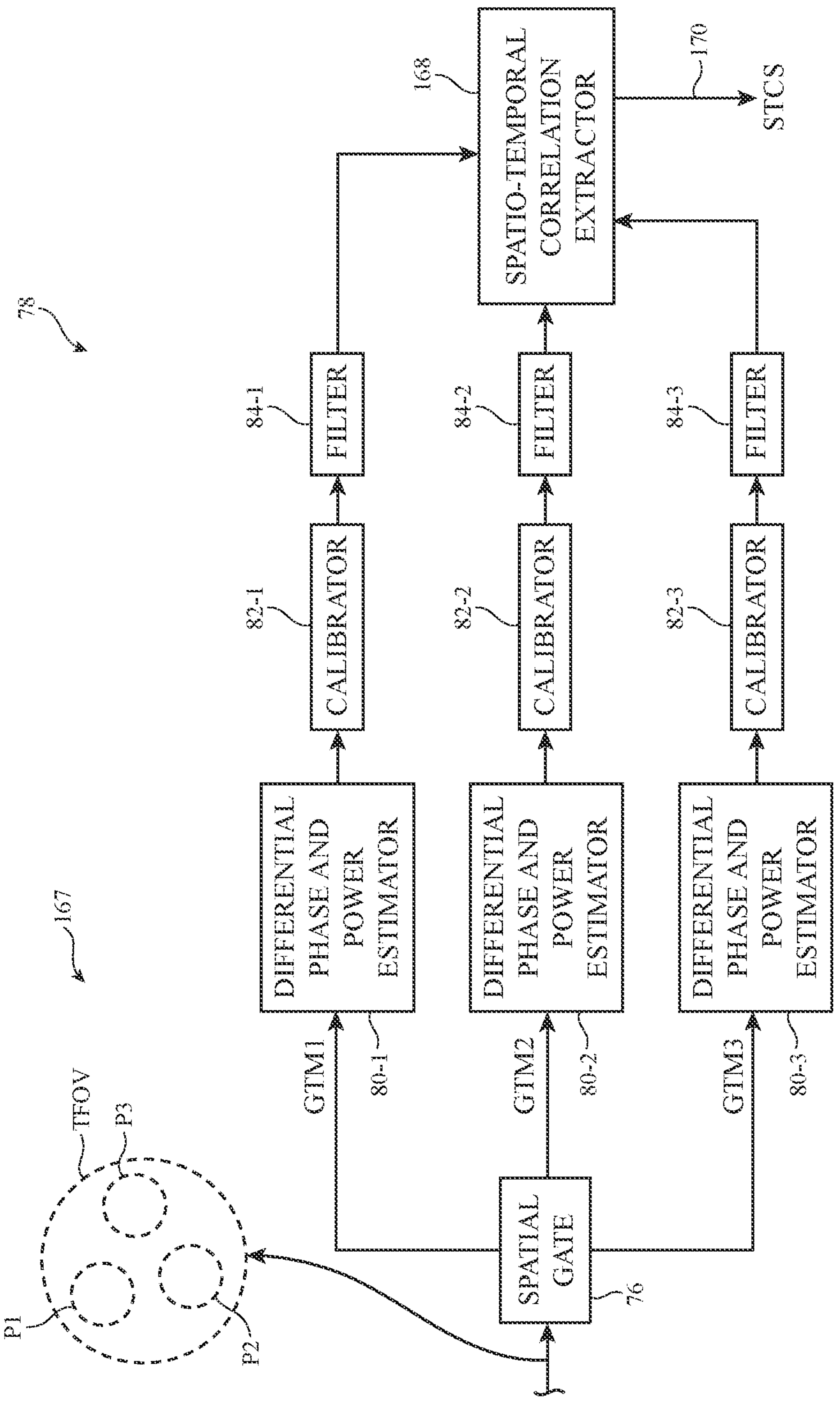
FIG. 13 is a diagram of an illustrative spatially-gated motion detection processor that performs target indicator extraction on spatio-temporal correlations in accordance with some embodiments.

If desired, MDP 78 may use process multiple gated target maps GTM in parallel and may use spatio-temporal correlations from the multiple gated target maps as the target indicator. FIG. 13 is a diagram showing one example of how MDP 78 may use process multiple gated target maps GTM in parallel and may use spatio-temporal correlations from the multiple gated target maps as the target indicator.

As shown in FIG. 13, MDP 78 may include three chains of differential phase and power estimators 80 (e.g., differential phase and power estimators 80-1, 80-2, and 80-3), calibrators 82 (e.g., calibrators 82-1, 82-2, and 82-3) and filters 84 (e.g., filters 84-1, 84-2, and 84-3) coupled in parallel between spatial gate 76 and a spatio-temporal correlation extractor 168 (sometimes also referred to herein as spatio-temporal correlator 168, spatio-temporal correlation circuitry 168, spatio-temporal correlation engine 168, spatio-temporal correlation block 168, or spatio-temporal correlation unit 168).

Spatial gate 76 may output a respective gated target map GTM onto each of the chains. For example, spatial gate 76 may output a first gated target map GTM1 associated with a first subset P1 of the total field of view TFOV of the radar (as shown by portion 167 of FIG. 13) to differential phase and power estimator 80-1, may output a second gated target map GTM2 associated with a second subset P2 of total field of view TFOV to differential phase and power estimator 80-2, and may output a third gated target map GTM3 associated with a third subset P3 of total field of view TFOV to differential phase and power estimator 80-3.

Each chain may generate, calibrate, and filter corresponding time series signals TSS based on its respective gated target map GTM and thus a respective portion P of total field of view TFOV. The filtered time series signals from different spatial regions (e.g., from different portions P of total field of view TFOV or equivalently from different gated target maps GTM) may be provided to spatio-temporal correlation extractor 168. Spatio-temporal correlation extractor 168 may identify, extract, calculate, estimate, compute, or otherwise generate spatio-temporal correlations in the phase series and/or power series signals across each of the spatial regions. Spatio-temporal correlation extractor 168 may generate spatio-temporal correlation signal STCS that identifies the spatio-temporal correlations and may provide spatio-temporal correlation signal STCS to target indicator extractor 86 (FIG. 4). Target indicator extractor 86 may generate motion-based indicator MBI and/or correlation-based indicator CBI based on spatio-temporal correlation signal STCS. MDP 78 may include two parallel chains or more than three parallel chains for parallel processing any desired number of gated target maps GTM.

Figure 14:
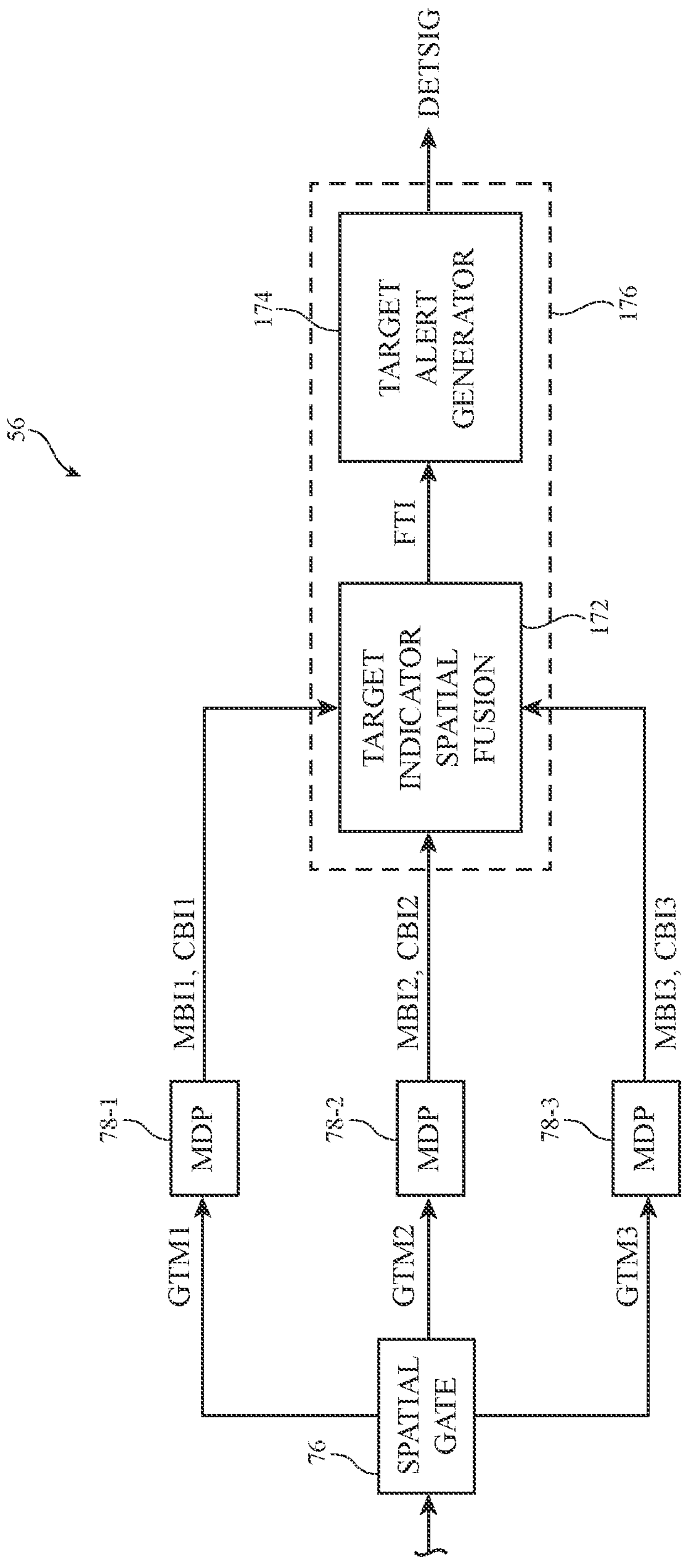
FIG. 14 is a diagram of an illustrative spatially-gated motion detection processor that performs target indicator or target alert spatial fusion in accordance with some embodiments.

If desired, sensing receiver 56 may include different respective MDPs 78 that operate on each gated target map in parallel and fusion may be performed at the target indicator level, as shown in the example of FIG. 14. As shown in FIG. 14, sensing receiver 56 may include three respective MDPs 78-1, 78-2, and 78-3 coupled in parallel between spatial gate 76 and target indicator spatial fusion circuitry 172. Each MDP 78 may generate a corresponding motion-based indicator MBI and correlation-based indicator CBI based on a respective gated target map GTM (e.g., MDP 78-1 may generate indicators MBI1 and CBI1 based on gated target map GTM1, MDP 78-2 may generate indicators MBI2 and CBI2 based on gated target map GTM2, and MDP 78-3 may generate indicators MBI3 and CBI3 based on gated target map GTM3).

Target indicator spatial fusion circuitry 172 may generate fused target indicator FTI based on any desired combination of indicators MBI1, MBI2, MBI3, CBI1, CBI2, and CBI3. Target alert generator 174 may generate detection signal DETSIG based on fused target indicator FTI. Alternatively, fusion may be performed at the target alert level (e.g., the operations of target indicator spatial fusion circuitry 172 and target alert generator 174 may be combined into a single target alert spatial fusion unit 176 that outputs detection signal DETSIG). Sensing receiver 56 may include two parallel MDP chains or more than three parallel MDP chains for parallel processing any desired number of gated target maps GTM.

Figure 15:
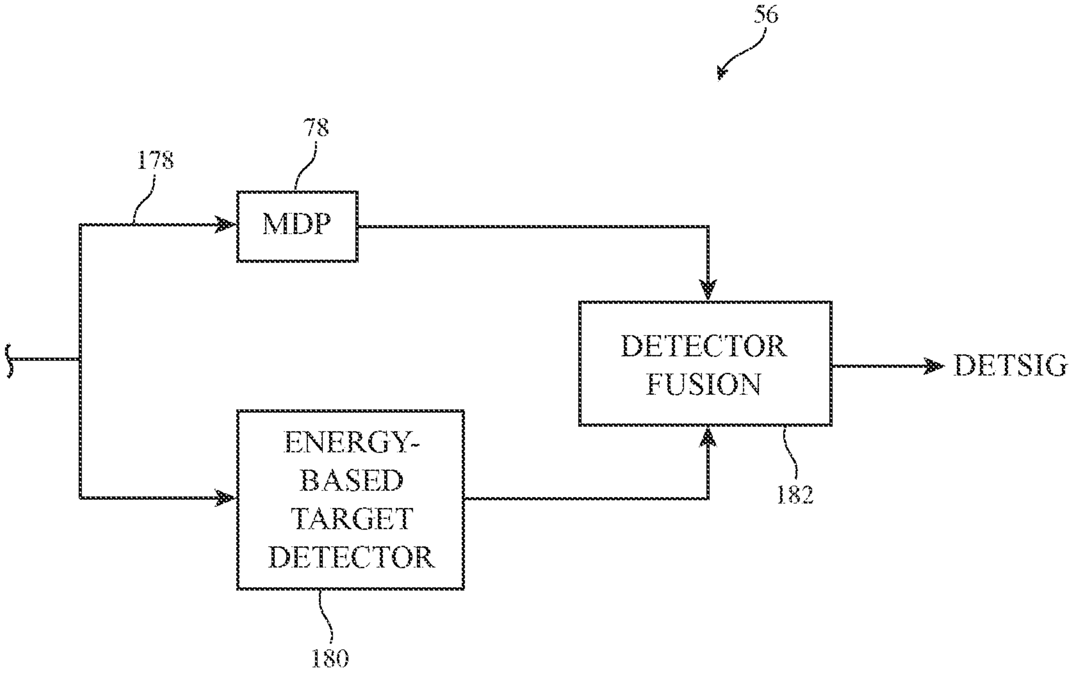
FIG. 15 is a diagram of an illustrative sensing receiver that performs parallel motion-based and energy-based external object detection in accordance with some embodiments.

If desired, sensing receiver 56 may perform both motion-based target detection and energy-based target detection, as shown in the example of FIG. 15. As shown in FIG. 15, sensing receiver 56 may include MDP 78 and energy-based target detector 180 coupled in parallel between input path 178 and detector fusion circuitry 182. Input path 178 may be coupled to the output of spatial gate 76 (FIG. 4). Energy-based target detector 180 may perform energy-based detection with leakage signal cancellation (e.g., using a constant false alarm rate (CFAR) scheme). Detector fusion circuitry 182 may combine the motion-based target detection result of MDP 78 with the energy-based target detection result of energy-based target detector 180 using any desired combination logic to output detection signal DETSIG.

As used herein, the term "concurrent" means at least partially overlapping in time. In other words, first and second events are referred to herein as being "concurrent" with each other if at least some of the first event occurs at the same time as at least some of the second event (e.g., if at least some of the first event occurs during, while, or when at least some of the second event occurs). First and second events can be concurrent if the first and second events are simultaneous (e.g., if the entire duration of the first event overlaps the entire duration of the second event in time) but can also be concurrent if the first and second events are non-simultaneous (e.g., if the first event starts before or after the start of the second event, if the first event ends before or after the end of the second event, or if the first and second events are partially non-overlapping in time). As used herein, the term "while" is synonymous with "concurrent."

As described above, one aspect of the present technology is the gathering and use of information such as biometric information or sensor information. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, eyeglasses prescription, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

If desired, an apparatus may be provided that includes means to perform one or more elements or any combination of elements of one or more methods or processes described herein.

If desired, one or more non-transitory computer-readable media may be provided that include instructions to cause an electronic device, upon execution of the instructions by one or more processors of the electronic device, to perform one or more elements or any combination of elements of one or more methods or processes described herein.

If desired, an apparatus may be provided that includes logic, modules, or circuitry to perform one or more elements or any combination of elements of one or more methods or processes described herein.

If desired, an apparatus may be provided that includes one or more processors and one or more non-transitory computer-readable storage media comprising instructions that, when executed by the one or more processors, cause the one or more processors to perform one or more elements or any combination of elements of one or more methods or processes described herein.

If desired, a signal (e.g., a signal encoded with data), datagram, information element (IE), packet, frame, segment, PDU, or message may be provided that includes or performs one or more elements or any combination of elements of one or more methods or processes described herein.

If desired, an electromagnetic signal may be provided that carries computer-readable instructions, where execution of the computer-readable instructions by one or more processors causes the one or more processors to perform one or more elements or any combination of elements of one or more methods or processes described herein.

If desired, a computer program may be provided that includes instructions, where execution of the program by a processing element causes the processing element to carry out one or more elements or any combination of elements of one or more methods or processes described herein.

The foregoing is merely illustrative and various modifications can be made to the described embodiments. The foregoing embodiments may be implemented individually or in any combination.

What is claimed is:

1. Wireless circuitry comprising:

a transmit path configured to be communicatively coupled to one or more antennas and configured to transmit a radar signal;

a receive path configured to be communicatively coupled to the one or more antennas and configured to receive a reflected radar signal, wherein transmission of the radar signal on the transmit path produces a leakage signal on the receive path; and one or more processors configured to detect an external object based on a fluctuation in the leakage signal over time.

2. The wireless circuitry of claim 1, wherein the fluctuation comprises a change in a phase of the leakage signal over time.

3. The wireless circuitry of claim 1, wherein the fluctuation comprises a fluctuation in the leakage signal over a first time window, the one or more processors being further configured to detect the external object based on an additional fluctuation of the leakage signal over a second time window that is longer than the first time window and that includes the first time window.

4. The wireless circuitry of claim 1, further comprising:

a mixer disposed on the receive path, the mixer having a first input configured to be communicatively coupled to the one or more antennas, a second input coupled to the transmit path over an additional path, and an output communicatively coupled to the one or more processors, the mixer being configured to receive a signal at the second input that includes the reflected radar signal and the leakage signal.

5. The wireless circuitry of claim 1, the one or more processors being further configured to:

detect a presence of an animate object within a threshold range of the electronic device based on the fluctuation in the leakage signal; and reduce an electromagnetic transmit power level of the electronic device responsive to detection of the animate object within the threshold range of the electronic device.

6. The wireless circuitry of claim 1, the one or more processors being further configured to:

detect a presence of a moving inanimate object within a threshold range of the electronic device based on the fluctuation in the leakage signal; and reduce an electromagnetic transmit power level of the electronic device responsive to detection of the moving inanimate object within the threshold range of the electronic device.

7. The wireless circuitry of claim 1, the one or more processors being further configured to:

generate, based on the fluctuation in the leakage signal, a first target map associated with a first portion of a field of view (FOV) of the one or more antennas and a second target gate map associated with a second portion of the FOV that is at least partially non-overlapping with respect to the first portion of the FOV; and detect the external object based on the first target map and the second target map.

8. The wireless circuitry of claim 1, the one or more processors being further configured to detect, based on the fluctuation in the leakage signal, biometric information associated with the external object.

9. The wireless circuitry of claim 1, wherein:

the fluctuation comprises a magnitude of a change, over time, in a phase of a time series signal of a beat signal, the beat signal is associated with the radar signal, the reflected radar signal, and the leakage signal, and the one or more processors are configured to detect the external object based on a comparison, to a threshold, of the magnitude of the change in the phase of the time series signal of the beat signal.

10. A method of operating wireless circuitry, the method comprising:

transmitting, using a transmit path, a radar signal;

receiving, using a receive path, a reflected radar signal;

generating, using a mixer on the receive path, a beat signal based on the radar signal, the reflected radar signal, and a leakage signal associated with leakage of the radar signal from the transmit path onto the receive path; and detecting, using one or more processors, an external object based on a time fluctuation in at least a portion of the beat signal, the portion of the beat signal including contribution from the leakage signal and the reflected radar signal.

11. The method of claim 10, wherein detecting the external object comprises comparing the time fluctuation to a threshold value.

12. The method of claim 10, wherein the time fluctuation comprises a change in phase over time and wherein detecting the external object comprises:

generating a first time series signal based on the change in phase over time within a first portion of a field of view;

generating a second time series signal based on the change in phase over time within a second portion of a field of view that is different from the first portion of the field of view;

generating a spatio-temporal correlation based on the first time series signal and the second time series signal; and comparing the spatio-temporal correlation to a threshold value.

13. The method of claim 10, wherein the time fluctuation comprises a change in power over time.

14. The method of claim 10, wherein detecting the external object comprises detecting the external object without removing the leakage signal from the beat signal.

15. The method of claim 10, wherein detecting the external object comprises:

comparing the time fluctuation to a first threshold for a first portion of a field of view; and comparing the time fluctuation to a second threshold for a second portion of the field of view different from the first portion of the field of view, the second threshold being different from the first threshold.

16. The method of claim 10, wherein the time fluctuation comprises a statistic associated with a change in phase over time and wherein detecting the external object comprises:

generating a target indicator based on the statistic over a time window; and comparing the target indicator to a threshold.

17. The method of claim 16, wherein detecting the external object further comprises:

generating an additional target indicator based on the statistic over an additional time window that is longer than the time window and that includes the time window;

generating a fused target indicator based on the target indicator and the additional target indicator; and comparing the fused target indicator to the threshold.

18. The method of claim 16, wherein detecting the external object further comprises:

generating an additional target indicator based on the statistic over an additional time window that is longer than the time window and that includes the time window; and comparing the additional target indicator to an additional threshold.

19. An electronic device comprising:

one or more antennas;

a transmit path coupled to the one or more antennas and configured to transmit a radar signal using the one or more antennas;

a receive path coupled to the one or more antennas and configured to receive a reflected radar signal using the one or more antennas;

a mixer on the receive path and configured to generate a beat signal based on the radar signal and the reflected radar signal; and one or more processors configured to detect an object external to the electronic device based on a first fluctuation of the beat signal over a first time window and based on a second fluctuation of the beat signal over a second time window, wherein the second time window is longer than the first time window and includes the first time window.

20. The electronic device of claim 19, wherein the fluctuation comprises a change in phase or power, the one or more processors being further configured to:

generate time series signals based on the change in phase or power;

generate, based on the time series signals, a motion based indicator associated with bulk motion of the object over a first time window;

generate, based on the time series signals, a correlation based indicator associated with micro-motion of the object over a second time window longer than the first time window; and identify, based on the correlation based indicator and the motion based indicator, a type of the object.

* * * * *